United States Patent
Fujita et al.

(10) Patent No.: US 11,236,820 B2
(45) Date of Patent: Feb. 1, 2022

(54) SHIFT CONTROL APPARATUS FOR VEHICLE AUTOMATIC TRANSMISSION

(71) Applicant: TOYOTA JIDOSHA KABUSHIKI KAISHA, Toyota (JP)

(72) Inventors: Asami Fujita, Toyota (JP); Kunio Hattori, Nagoya (JP); Jun Amano, Toyota (JP); Atsushi Ayabe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/093,828

(22) Filed: Nov. 10, 2020

(65) Prior Publication Data
US 2021/0148460 A1    May 20, 2021

(30) Foreign Application Priority Data
Nov. 14, 2019 (JP) .............................. JP2019-206536

(51) Int. Cl.
*F16H 61/04* (2006.01)
*F16H 61/06* (2006.01)
(Continued)

(52) U.S. Cl.
CPC ....... *F16H 61/061* (2013.01); *F16H 61/0403* (2013.01); *F16H 61/08* (2013.01); *F16H 2061/064* (2013.01); *F16H 2061/661* (2013.01)

(58) Field of Classification Search
CPC ...... F16H 61/04; F16H 61/0403; F16H 61/08; F16H 2061/661
See application file for complete search history.

(56) References Cited

U.S. PATENT DOCUMENTS 5,460,584 A * 10/1995 Kusaka ................. F16H 61/143
                                                    477/139
5,879,266 A *  3/1999 Sawamura ............ B60W 30/18
                                                    477/62
(Continued)

FOREIGN PATENT DOCUMENTS

CN         1629520 A      6/2005
CN       104442347 A      3/2015
(Continued)

*Primary Examiner* — Huan Le
(74) *Attorney, Agent, or Firm* — Oblon, McClelland, Maier & Neustadt, L.L.P.

(57) ABSTRACT

A shift control apparatus for a vehicle automatic transmission to be provided in a vehicle that includes a hydraulic transmission device having a lockup clutch, an engine, an input shaft connected to the engine through the hydraulic transmission device, and drive wheels. The shift control apparatus includes a shift-down control portion configured, when a shift-down operation is executed to establish a first gear position by releasing a second engagement device, during running of the vehicle in a driven state with a second gear position being established with engagement of the second engagement device, to increase a torque of the engine so as to increase an input rotational speed as a rotational speed of the input shaft through the lockup clutch that is placed in an engaged state, and to release the lockup clutch before the input rotational speed reaches a synchronous speed of the first gear position.

9 Claims, 5 Drawing Sheets

(51) Int. Cl.
*F16H 61/08* (2006.01)
*F16H 61/66* (2006.01)

(56) References Cited

U.S. PATENT DOCUMENTS

| | | | |
|---|---|---|---|
| 7,416,515 B2 * | 8/2008 | Iriyama | B60W 10/06 |
| | | | 477/107 |
| 10,808,835 B2 * | 10/2020 | Tsukamoto | F16H 61/0213 |
| 2005/0137059 A1 | 6/2005 | Takahashi | |
| 2015/0080174 A1 | 3/2015 | Lee et al. | |
| 2019/0145516 A1 | 5/2019 | Murakami et al. | |
| 2019/0271391 A1 | 9/2019 | Takeda et al. | |
| 2020/0114915 A1 | 4/2020 | Hattori et al. | |

FOREIGN PATENT DOCUMENTS

| | | |
|---|---|---|
| CN | 109578575 A | 4/2019 |
| CN | 109780154 A | 5/2019 |
| JP | 05-288268 A | 11/1993 |
| JP | 2000-179677 A | 6/2000 |
| JP | 2019-152274 A | 9/2019 |

* cited by examiner

FIG.4

| RANGES | | ENGAGEMENT DEVICES | | | |
|---|---|---|---|---|---|
| | | C1 | C2 | B1 | SOWC |
| P | | | | | |
| R | | | | ○ | ○ |
| N | | | | | |
| D | D1 | ○ | | | |
| | D2 | | ○ | | |
| M | M1 | ○ | | | ○ |
| | M2 | | ○ | | |

US 11,236,820 B2

SHIFT CONTROL APPARATUS FOR VEHICLE AUTOMATIC TRANSMISSION

This application claims priority from Japanese Patent Application No. 2019-206536 filed on Nov. 14, 2019, the disclosure of which is herein incorporated by reference in its entirety.

FIELD OF THE INVENTION

The present invention relates to a vehicle automatic transmission, and more particularly, to a shift control apparatus for the vehicle automatic transmission that is connected to an engine through a hydraulic transmission device having a lockup clutch.

BACKGROUND OF THE INVENTION

There is known a vehicle automatic transmission which is disposed between drive wheels and an input shaft connected to an engine through a hydraulic transmission device having a lockup clutch, and which includes first and second engagement devices, such that at least a first gear position is established with the first engagement device being engaged, and at least a second gear position is established with the second engagement device being engaged, and such that the vehicle automatic transmission is configured to transmit a drive force at a first gear ratio when the first gear position is established, and to transmit the drive force at a second gear ratio lower than the first gear ratio when the second gear position is established (see JP-H05-288268A) Further, in JP-2019-152274A, there is proposed a vehicle automatic transmission which has first and second drive-force transmission paths provided in parallel to each other between drive wheels and an input shaft connected to an engine through a hydraulic transmission device having a lockup clutch, wherein the first drive-force transmission path is provided with a first engagement device, such that at least a first gear position is established with the first engagement device being engaged, and at least a second gear position is established with the second engagement device being engaged, and such that the vehicle automatic transmission is configured to transmit a drive force at a first gear ratio along the first drive-force transmission path when the first gear position is established, and to transmit the drive force at a second gear ratio lower than the first gear ratio along the second drive-force transmission path when the second gear position is established.

In each of the above-described vehicle automatic transmissions which is connected to the engine through the hydraulic transmission device having the lockup clutch, a large shifting shock could be caused if the lockup clutch is engaged when the automatic transmission is shifted down to the first gear position with release of the second engagement device. Therefore, it is common that the lockup clutch is released at a certain timing when the transmission is shifted down to the first gear position (see JP-H05-288268A).

SUMMARY OF THE INVENTION

By the way, when a shift down action is to be executed during running of the vehicle in a driven state, it might be possible to quickly increase an input rotational speed by executing a torque-increase control operation for temporarily increase an engine torque. In this case, if the lockup clutch is released, a controllability of the input rotational speed is reduced due to deviation of the input rotational speed from a rotational speed of the engine, thereby making it difficult to quickly execute the shift down action while suppressing the shifting shock. On the other hand, if the shift down action is executed with the input shaft being connected directly with the engine by engagement of the lockup clutch, the shifting shock could be increased due to an inertia of the engine that causes, for example, drive force change and noise generation upon synchronization after completion of the shift down action, although the controllability of the input rotational speed might be increased.

The present invention was made in view of the background art described above. It is therefore an object of the present invention to make it possible, when a shift down action is executed together with execution of the torque-increase control operation during running of the vehicle in the driven state, to suppress the shifting shock upon synchronization after completion of the shift down action while assuring controllability of the input rotational speed.

The object indicated above is achieved according to the following aspects of the present invention.

According to a first aspect of the invention, there is provided a shift control apparatus for a vehicle automatic transmission that is to be provided in a vehicle, the vehicle including, in addition to the vehicle automatic transmission, a hydraulic transmission device having a lockup clutch, an engine, an input shaft connected to the engine through the hydraulic transmission device, and drive wheels, wherein the vehicle automatic transmission is disposed between the input shaft and the drive wheels, and includes first and second engagement devices, such that at least a first gear position is established with the first engagement device being engaged, and at least a second gear position is established with the second engagement device being engaged, and such that the vehicle automatic transmission is configured to transmit a drive force at a first gear ratio when the first gear position is established, and to transmit the drive force at a second gear ratio lower than the first gear ratio when the second gear position is established, wherein the shift control apparatus comprises a shift-down control portion configured, when a shift-down operation is executed to establish the first gear position by releasing the second engagement device, during running of the vehicle in a driven state with the second gear position being established with engagement of the second engagement device, to execute a torque-increase control operation for increasing a torque of the engine so as to increase an input rotational speed as a rotational speed of the input shaft through the lockup clutch that is placed in an engaged state, and to release the lockup clutch before the input rotational speed reaches a synchronous speed of the first gear position. The shift control apparatus may further comprise an engine control portion and a lockup-clutch control portion, wherein the shift-down control portion is configured to cause the engine control portion to execute the torque-increase control operation, and wherein the shift-down control portion is configured to cause the lockup-clutch control portion to release the lockup clutch before the input rotational speed reaches the synchronous speed of the first gear position.

It is noted that the above-described running of the vehicle in the driven state is defined as a running of the vehicle in a state in which the vehicle automatic transmission is driven by rotation of the drive wheels or the engine is driven by rotation of the drive wheels through the vehicle automatic transmission. For example, an inertial running and a running on a downhill road correspond to the running of the vehicle in the driven state. It is further noted that the synchronous speed of the first gear position corresponds to a product of the first gear ratio and an output rotational speed of the vehicle automatic transmission that is dependent on a running speed of the vehicle.

According to a second aspect of the invention, in the shift control apparatus according to the first aspect of the invention, the vehicle automatic transmission has first and second drive-force transmission paths provided in parallel to each other between the input shaft and the drive wheels, wherein the first drive-force transmission path is provided with the first engagement device, such that the drive force is to be transmitted along the first drive-force transmission path when the first gear position is established with engagement of the first engagement device, and wherein the second drive-force transmission path is provided with the second engagement device, such that the drive force is to be transmitted along the second drive-force transmission path when the second gear position is established with engagement of the second engagement device.

According to a third aspect of the invention, in the shift control apparatus according to the second aspect of the invention, the first engagement device includes a mode-switching clutch device that is switchable between a one-way mode and a lock mode, such that the mode-switching clutch device is configured to transmit the drive force during the running of the vehicle in a driving state and to cut off transmission of the drive force during the running of the vehicle in the driven state when the mode-switching clutch device is placed in the one-way mode, and such that the mode-switching clutch device is configured to transmit the drive force during the running of the vehicle in the driving state and during the running of the vehicle in the driven state when the mode-switching clutch device is placed in the lock mode, wherein the shift-down control portion is configured to switch the mode-switching clutch device from the one-way mode to the lock mode in a stage in which the input rotational speed has reached the synchronous speed of the first gear position.

It is noted that the above-described running of the vehicle in the driving state is defined as a running of the vehicle in a state in which the drive force is transmitted to the drive wheels from the engine through the vehicle automatic transmission, namely, the engine or the vehicle automatic transmission is driving the drive wheels.

According to a fourth aspect of the invention, in the shift control apparatus according to the third aspect of the invention, the first engagement device includes, in addition to the mode-switching clutch device, a first clutch that is to be frictionally engaged, wherein the first drive-force transmission path is provided with the mode-switching clutch device and the first clutch, such that the first clutch is disposed in series with the mode-switching clutch device and is located between the mode-switching clutch device and the input shaft in the first drive-force transmission path, wherein the second engagement device includes a second clutch that is to be frictionally engaged, wherein the second drive-force transmission path is provided with the second clutch, and wherein, when the shift-down operation is executed to switch the vehicle automatic transmission to the first gear position from the second gear position that is established with engagement of the second clutch and release of the first clutch, the shift-down control portion is configured to release the second clutch and engage the first clutch, prior to execution of the torque-increase control operation for increasing the torque of the engine.

According to a fifth aspect of the invention, in the shift control apparatus according to any one of the second through fourth aspects of the invention, the first drive-force transmission path is provided with a gear transmission device that is disposed in series with the first engagement device in the first drive-force transmission path, such that the drive force is to be transmitted at the first gear ratio through the gear transmission device along the first drive-force transmission path when the first gear position is established with engagement of the first engagement device, wherein the second drive-force transmission path is provided with a continuously-variable transmission that is disposed in series with the second engagement device in the second drive-force transmission path, such that the drive force is to be transmitted at an arbitrary gear ratio through the continuously-variable transmission along the second-force transmission path, the arbitrary gear ratio being at least between the second gear ratio and a third gear ratio that is lower than the second gear ratio.

According to a sixth aspect of the invention, in the shift control apparatus according to any one of the first through fifth aspects of the invention, the shift-down control portion is configured to calculate a rate of change of the input rotational speed, and to determine a timing of output of a releasing command for releasing the lockup clutch, in accordance with a predetermined criteria, based on the calculated rate of change and a releasing response time that is a length of time from the output of the releasing command until the lockup clutch is actually released, the predetermined criteria being determined such that the lockup clutch is released before the input rotational speed reaches the synchronous speed of the first gear position.

According to a seventh aspect of the invention, in the shift control apparatus according to the sixth aspect of the invention, the shift-down control portion is configured to estimate a remaining time until the input rotational speed reaches the synchronous speed of the first gear position, based on the rate of change of the input rotational speed, and to determine the timing of the output of the releasing command for releasing the lockup clutch, by comparing the remaining time and the releasing response time.

According to an eighth aspect of the invention, in the shift control apparatus according to any one of the first through seventh aspects of the invention, the shift-down control portion is configured, when the lockup clutch is in a released state during the running of the vehicle in the driven state with the second gear position being established, to determine a timing of output of an engaging command for engaging the lockup clutch, in accordance with a predetermined criteria, based on a response time that is a length of time from output of a releasing command for releasing the second engagement device until the second engagement device is actually released, and a response time that is a length of time from the output of the engaging command for engaging the lockup clutch until the lockup clutch is actually engaged, the predetermined criteria being determined such that the lockup clutch is engaged after the second engagement device has been released.

In the shift control apparatus according to the present invention, when the shift-down operation is executed to establish the first gear position during the running of the vehicle in the driven state with the second gear position being established, the input rotational speed is increased through the lockup clutch placed in the engaged state during execution of the torque-increase control operation for increasing the torque of the engine, so that a controllability of the input rotational speed is improved whereby the input rotational speed can be quickly increased and accordingly the shift-down operation can be appropriately executed. Further, since the lockup clutch is released before the input rotational speed reaches the synchronous speed of the first gear position, it is possible to appropriately suppress a shifting shock caused by, for example, an engine inertia upon synchronization of the input rotational speed after execution of the shift-down operation. That is, when the shift-down operation is executed to establish the first gear position during the running of the vehicle in the driven state, with the input rotational speed being increased by the execution of the torque-increase control operation for increasing the torque of the engine, it is possible to assure the controllability of the input rotational speed by causing the input shaft to be connected directly to the engine, and to suppress the shifting shock upon the synchronization by casing the lockup clutch to be released before the synchronization after the execution of the shift-down operation.

In an arrangement in which the first engagement device provided in the first drive-force transmission path includes the mode-switching clutch device that is to be switched between the one-way mode and the lock mode, there is a possibility that a noise such as a contact noise could be generated due to an effect of the one-way mode, i.e., the same effect of an one-way clutch upon the synchronization (upon completion of a shifting action) in a case in which the mode-switching clutch device is switched from the one-way mode to the lock mode in the stage in which the input rotational speed has reached the synchronous speed of the first gear position. However, in the shift control apparatus according to the third aspect of the invention, the lockup clutch is released before the input rotational speed reaches the synchronous speed of the first gear position, the generation of the noise such as the contact noise can be suppressed. Further, by placing the mode-switching clutch device into the lock mode in the stage in which the input rotational speed has reached the synchronous speed of the first gear position, the engine is driven depending on a running speed of the vehicle whereby an engine brake can be appropriately obtained.

In the shift control apparatus according to the fourth aspect of the invention, in an arrangement in which the first engagement device includes the mode-switching clutch device and the second engagement device includes the second clutch, the second clutch is engaged while the first clutch is released when the second gear position is established. Therefore, when the second gear position is established, the mode-switching clutch device is held in a state in which its rotation is substantially stopped, so that a load applied to the engine is reduced whereby a fuel efficiency is improved. Further, when the shift-down operation is executed from the second gear position to the first gear position, the second clutch is released and the first clutch is engaged prior to execution of the torque-increase control operation for increasing the torque of the engine, so that a rotational speed of the mode-switching clutch device is increased together with increase of the input rotational speed, whereby the shift-down operation can be smoothly progressed.

In the shift control apparatus according to the sixth aspect of the invention, the rate of change of the input rotational speed is calculated, and the timing of the output of the releasing command for releasing the lockup clutch is determined, in accordance with the predetermined criteria, based on the calculated rate of change and the releasing response time of the lockup clutch, wherein the predetermined criteria is determined such that the lockup clutch is released before the input rotational speed reaches the synchronous speed of the first gear position. Owing to this arrangement, it is possible to release the lockup clutch at the timing that is suitable for suppressing the shifting shock upon the synchronization after the execution of the shift-down operation, while assuring the controllability of the input rotational speed by the engagement of the lockup clutch.

In the shift control apparatus according to the seventh aspect of the invention, the remaining time until the input rotational speed reaches the synchronous speed of the first gear position is estimated based on the rate of change of the input rotational speed, and the timing for the output of the releasing command for releasing the lockup clutch is determined by comparing the remaining time and the releasing response time of the lockup clutch. Owing to this arrangement, it is possible to appropriately suppress the shifting shock upon the synchronization after the execution of the shift-down operation, while assuring the controllability of the input rotational speed.

In the shift control apparatus according to the eighth aspect of the invention, when the lockup clutch is in the released state during the running of the vehicle in the driven state with the second gear position being established, the timing of the output of the engaging command for engaging the lockup clutch, in accordance with the predetermined criteria, based on the releasing response time of the second engagement device and the engaging response time of the lockup clutch, wherein the predetermined criteria is determined such that the lockup clutch is engaged after the second engagement device has been released. Owing to this arrangement, the second drive-force transmission path is cut off upon engagement of the lockup clutch, whereby a shock upon the engagement of the lockup clutch can be suppressed while the controllability of the input rotational speed can be improved by the direct connection of the input shaft with the engine.

BRIEF DESCRIPTION OF THE DRAWINGS

FIG. 4 is a table indicating an operation state of each of engagement devices included in an automatic transmission show in FIG. 1, for explaining a relationship between the operation state of each of the engagement devices and each of a plurality of ranges selected by operation of a shift lever;

DETAILED DESCRIPTION OF PREFERRED EMBODIMENT

Figure 1:
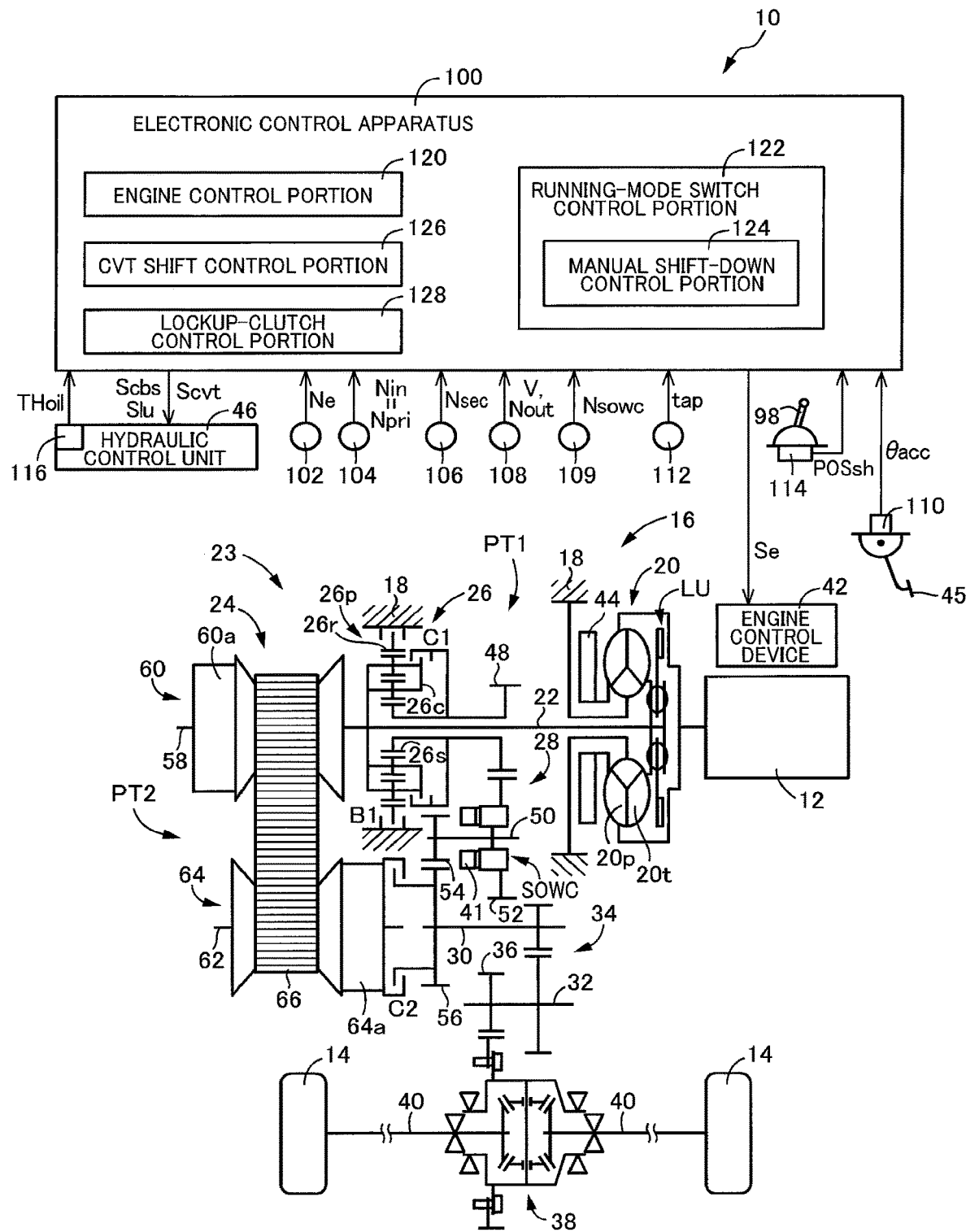
FIG. 1 is a view schematically showing a construction of a drive system of a vehicle to which the present invention is applied, for explaining major portions of control functions and systems for performing various controls in the vehicle.

The present invention is applied advantageously to a shift control apparatus for a vehicle automatic transmission that has first and second drive-force transmission paths provided in parallel to each other between drive wheels and an input shaft that is connected to an engine through a hydraulic transmission device having a lockup clutch, wherein the first drive-force transmission path is provided with a first engagement device, such that a drive force is to be transmitted at least at a first gear ratio along the first drive-force transmission path when a first gear position is established with engagement of the first engagement device, and wherein the second drive-force transmission path is provided with a second engagement device, such that the drive force is to be transmitted at least at a second gear ratio lower than the first gear ratio along the second drive-force transmission path when a second gear position is established with engagement of the second engagement device. However, the provision of the first and second drive-force transmission path in parallel to each other is not essential. The present invention is applicable also to a shift control apparatus for a step-variable transmission of, for example, planetary gear type and two-shaft meshing type in which a plurality of gear positions providing respective different gear ratios can be established depending on operation states (i.e., engaged/released states) of a plurality of engagement devices, as long as the transmission corresponds to the vehicle automatic transmission in which at least the first and second gear positions can be established with engagements of the respective first and second engagement devices.

The present invention is applied advantageously to an engine drive vehicle having an engine (internal combustion engine) as a drive force source. However, the present invention is applicable also to a hybrid vehicle having an engine and an electric motor as drive force sources. It is widely known that the hydraulic transmission device is constituted by a torque converter. However, the hydraulic transmission device may be constituted by a fluid coupling.

The first engagement device may be constituted by a frictional engagement device that is to be frictionally engaged by, for example, a hydraulic pressure or the like. However, the first engagement device may be constituted also by a mode-switching clutch device that is switchable between a one-way mode and a lock mode. The mode-switching clutch device may include a one-way clutch which is engaged, for example, during running of the vehicle in the driving state, and a lock clutch which is provided in parallel to the one-way clutch and which is engaged at least during the running in the driven state. The lock clutch is an electronically-controlled clutch which is to be controlled to be released when the mode-switching clutch device is placed in the one-way mode and which is to be controlled to be engaged at least during the running in the driven state when the mode-switching clutch device is placed in the lock mode. It is appropriate that the lock clutch is constituted by, for example, a one-way clutch that is be engaged only during the running in the driven state. However, the lock clutch may be constituted by a friction clutch or a dog clutch that is to be engaged irrespective of whether the vehicle is running in the driving state or driven state. It is preferable that a first clutch, which is to be frictionally engaged, is provided to be series with the mode-switching clutch device such that the first clutch is located between the mode-switching clutch device and the input shaft. However, the provision of the first clutch is not essential. The second engagement device preferably includes a frictional engagement device that is to be frictionally engaged by, for example, a hydraulic pressure or the like. Further, each of the first and second engagement devices may include a brake configured to stop rotation of a certain rotary element.

The first drive-force transmission path is provided with, for example, a gear transmission device, while the second drive-force transmission path is provided with, for example, a continuously-variable transmission. However, the first drive-force transmission path may be provided with a continuously-variable transmission that provides a high gear ratio when the first gear position is established, while the second drive-force transmission path may be provided with a gear transmission device that provides a low gear ratio when the second gear position is established. The gear transmission device may be a transmission device configured to transmit the drive force at a constant gear ratio. However, the gear transmission device may be constituted by a step-variable transmission of planetary gear or other gear type, which is capable of establishing a plurality of gear positions providing respective different gear ratios. The continuously-variable transmission may be constituted by either a continuously-variable transmission of belt, toroidal or other mechanical type, or a continuously-variable transmission of electric type. The first gear ratio of the first gear position or the second gear ratio of the second gear position may be one, so that rotation of the input shaft is transmitted to, for example, the output shaft, without a speed of the rotation being changed.

It is preferable that the shift-down control portion is configured to calculate a rate of actual change of the input rotational speed, to estimate a remaining time until the input rotational speed reaches a synchronous speed of the first gear position, and to determine a timing of output of a releasing command for releasing the lockup clutch, based on a releasing response time of the lockup clutch, such that the lockup clutch is released shortly before the input rotational speed reaches the synchronous speed of the first gear position. However, the releasing command for releasing the lockup clutch may be outputted, for example, at a point of time at which the input rotational speed has reached a certain rotational speed that is lower than the synchronous speed of the first gear position by a certain speed value, as long as the lockup clutch is released at least before the input rotational speed reaches the synchronous speed of the first gear position. The above-described certain speed value is a predetermined value that is determined, for example, based on an amount of increase of the engine torque, such that the lockup clutch is reliably released before the input rotational speed reaches the synchronous speed of the first gear position.

It is preferable that the shift-down control portion is configured, when the lockup clutch is in the released state during the running of the vehicle in the driven state with the second gear position being established, to determine a timing of output of an engaging command for engaging the lockup clutch, based on a releasing response time of the second engagement device and an engaging response time of the lockup clutch, such that the lockup clutch is engaged after the second engagement device has been released. However, the lockup clutch may be engaged even before the second engagement device is released. It is preferable to cause the lockup clutch to be engaged before the engine torque starts to be increased by execution of the torque-increase control operation. In other words, it is preferable to execute the torque-increase control operation for the engine such that the engine torque starts to be increased after the lockup clutch has been engaged.

A shift-down control operation, which is to be executed by the shift-down control portion, may be executed, for example, only when a manual shift-down operation is executed in response to a shift-down operation manually executed by a driver of the vehicle to request execution of the manual shift-down operation. However, also in a case in which an automatic shift-down operation is executed based on, for example, a running state of the vehicle, when the engine is forcibly driven or rotated depending on a running speed of the vehicle, with the first gear position being established, it is preferable that the shift-down control operation is executed in accordance with the present invention. That is, the present invention is applicable irrespective of whether the manual shift-down operation can be executed or not, in response to the shift-down operation manually executed by the vehicle driver.

The torque-increase control operation is to be executed to temporarily increase the engine torque so as to quickly increase the input rotational speed to the synchronous speed of the first gear position while suppressing a shifting shock. Various setting values such as a value of the engine torque and an increased amount of the engine torque in the execution of the torque-increase control operation, a start timing and an end timing of the execution of the torque-increase control operation, and a duration of the execution of the torque-increase control operation are predetermined through experimentation or the like, such that the input rotational speed can be appropriately increased. However, the setting values may be learned (corrected) based on, for example, change of the input rotational speed.

Embodiment

Hereinafter, a preferred embodiment of the invention will be described in detail with reference to the accompanying drawings. The figures of the drawings are simplified or deformed as needed, and each portion is not necessarily precisely depicted in terms of dimension ratio, shape, etc.

FIG. 1 is a view schematically showing a construction of a drive system of a vehicle 10 to which the present invention is applied, for explaining major portions of control functions and systems for performing various controls in the vehicle 10. As shown in FIG. 1, the vehicle 10 includes a vehicle drive-force transmitting apparatus 16 (hereinafter simply referred to as "drive-force transmitting apparatus 16") configured to transmit a drive force of an engine 12 serving as a drive force source, to drive wheels 14. The engine 12 is an internal combustion engine such as gasoline engine and diesel engine, and is provided with an engine control device 42 including an electronic throttle valve, a fuel injection device, an ignition device and other various devices that are required to control an output of the engine 12. The engine 12 is controlled by an electronic control apparatus 100 that will be described below. Specifically, an engine torque TE as an output torque of the engine 12 is controlled by the electronic control apparatus 100 that is configured to control the engine control device 42, based on, for example, an acceleration operation amount θacc as an amount of operation of an accelerator pedal 45 that corresponds to a required drive force of the vehicle 10 required by a vehicle driver of the vehicle 10.

The drive-force transmitting apparatus 16 is disposed between the engine 12 and the drive wheels 14. The drive-force transmitting apparatus 16 includes a non-rotary member in the form of a casing 18, a hydraulically-operated type drive-force transmitting device, i.e., a hydraulic transmission device in the form of a known torque converter 20 that is connected to the engine 12, an input shaft 22 connected to the torque converter 20, an automatic transmission 23 connected to the input shaft 22, an output shaft 30 connected to an output side of the automatic transmission 23, a counter shaft 32, a reduction gear device 34 consisting of a pair of mutually meshing gears each of which is connected to a corresponding one of the output shaft 30 and the counter shaft 32 so as to be unrotatable relative to the corresponding one of the shafts 30, 32, a gear 36 connected to the counter shaft 32 so as to be unrotatable relative to the counter shaft 32, and a differential gear device 38 connected to the gear 36 in a drive-force transmittable manner. The torque converter 20, input shaft 22, automatic transmission 23, output shaft 30, counter shaft 32, reduction gear device 34, gear 36 and differential gear device 38 are disposed within the casing 18. The drive-force transmitting apparatus 16 further includes right and left axles 40 that are connected to the differential gear device 38. In the drive-force transmitting apparatus 16 constructed as described above, the drive force of the engine 12 is sequentially transmitted to the right and left drive wheels 14, through the torque converter 20, input shaft 22, automatic transmission 23, output shaft 30, reduction gear device 34, differential gear device 38 and axles 40, for example.

The torque converter 20 includes a pump impeller 20p connected to the engine 12 and a turbine impeller 20t connected to the input shaft 22, and transmits the drive force of the engine 12 to the input shaft 22 through a fluid. The torque converter 20 is provided with a lockup clutch LU that can directly connect between the pump impeller 20p and the turbine impeller 20t, namely, between input and output rotary members of the torque converter 20. The lockup clutch LU directly connects between the pump impeller 20p and the turbine impeller 20t, namely, between the engine 12 and the input shaft 22, depending on a running state of the vehicle 10. For example, in a relatively high running speed range, the engine 12 and the input shaft 22 are directly connected through the lockup clutch LU.

The automatic transmission 23 includes a continuously-variable transmission mechanism in the form of a known belt-type continuously-variable transmission (CVT) 24 connected to the input shaft 22, a forward/reverse switching device 26 connected to the input shaft 22, and a gear transmission device in the form of a gear transmission mechanism 28 connected to the input shaft 22 through the forward/reverse switching device 26. The forward/reverse switching device 26 and the gear transmission mechanism 28 are connected in series to each other, and are arranged in parallel with the continuously-variable transmission 24 between the input shaft 22 and the output shaft 30. That is, the automatic transmission 23 has two drive-force transmission paths, i.e., first and second drive-force transmission paths PT1, PT2 that are provided in parallel to each other between the input shaft 22 and the output shaft 30, such that the drive force of the engine 12 is to be transmitted from the input shaft 22 to the output shaft 30 through the forward/reverse switching device 26 and the gear transmission mechanism 28 along the first drive-force transmission path PT1, and such that the drive force of the engine 12 is to be transmitted from the input shaft 22 to the output shaft 30 through the continuously-variable transmission 24 along the second drive-force transmission path PT2. The automatic transmission 23 switches between the first and second drive-force transmission paths PT1, PT2, depending on the running state of the vehicle 10. The automatic transmission 23 corresponds to "vehicle automatic transmission" recited in the appended claims.

The automatic transmission 23 includes a plurality of engagement devices that are to be operated to establish a selected one of the first and second drive-force transmission paths PT1, PT2, such that the drive force of the engine 12 is to be transmitted along the selected one of the two drive-force transmission paths. The engagement devices include engagement devices in the form of a first clutch C1 and a first brake B1 each of which is configured to connect and disconnect the first drive-force transmission path PT1, namely, each of which is to be engaged to establish the first drive-force transmission path PT1 through which the drive force is to be transmitted through the gear transmission mechanism 28. The engagement devices further includes an engagement device in the form of a second clutch C2 that is configured to connect and disconnect the second drive-force transmission path PT2, namely, that is to be engaged to establish the second drive-force transmission path PT2 through which the drive force is to be transmitted through the continuously-variable transmission 24. Each of the first clutch C1, first brake B1 and second clutch C2 is a hydraulically-operated frictional engagement device that is to be operated by a hydraulic actuator so as to be frictionally engaged, and is an wet frictional engagement device including a frictional engagement plate that is to be lubricated by a lubricant oil.

The forward/reverse switching device 26, which is provided in the first drive-force transmission path PT1, is disposed to be coaxial with the input shaft 22, and includes a planetary gear device 26p of single-pinion type and the above-described first clutch C1 and first brake B1. The planetary gear device 26p is a differential mechanism including three rotary elements consisting of a carrier 26c as an input element, a sun gear 26s as an output element and a ring gear 26r as a reaction element. The carrier 26c is connected integrally with the input shaft 22. The ring gear 26r is selectively connected to the casing 18 through the first brake B1. The sun gear 26s is connected to a small-diameter gear 48 that is disposed to be coaxial with the input shaft 22 and rotatable about an axis of the input shaft 22 relative to the input shaft 22. Further, the carrier 26c and the sun gear 26s are selectively connected to each other through the first clutch C1. The first clutch C1 is the engagement device that is configured, when being engaged, to connect two of the three rotary elements so as to cause the planetary gear device 26p to be rotated as a single unit. The first brake B1 is the engagement device that is configured, when being engaged, to connect the ring gear 26r as the reaction element with the casing 18.

The gear transmission mechanism 28 includes, in addition to the above-described small-diameter gear 48, a counter shaft 50 and a large-diameter gear 52 that is disposed to be coaxial with the counter shaft 50 and rotatable about an axis of the counter shaft 50 relative to the counter shaft 50. The large-diameter gear 52 meshes with the small-diameter gear 48. The gear transmission mechanism 28 further includes a drive gear 54 provided to be rotatable integrally with the counter shaft 50, and a driven gear 56 provided to be rotatable integrally with the output shaft 30. The driven gear 56 meshes with the drive gear 54, and has a diameter larger than the drive gear 54.

The first drive-force transmission path PT1 is provided with, in addition to the forward/reverse switching device 26 (including the first clutch C1 and the first brake B1) and the gear transmission mechanism 28, a mode-switching clutch device SOWC serving as a first engagement device, such that the drive force of the engine 12 is to be transmitted from the input shaft 22 to the drive wheels 14 through the forward/reverse switching device 26, gear transmission mechanism 28, and mode-switching clutch device SOWC along the first drive-force transmission path PT1. In the first drive-force transmission path PT1, the forward/reverse switching device 26 and the gear transmission mechanism 28 are arranged in series with each other in this order of description in a direction away from the input shaft 22 toward the output shaft 30, and the mode-switching clutch device SOWC is disposed in an intermedia portion of the gear transmission mechanism 28, namely, interposed between the large-diameter gear 52 and the counter shaft 50. The first clutch C1 serves as another first engagement device which is disposed in series with the mode-switching clutch device SOWC and which is located between the mode-switching clutch device SOWC and the input shaft 22 in the first drive-force transmission path PT1.

The mode-switching clutch device SOWC, which is provided in the first drive-force transmission path PT1, is switchable between a one-way mode and a lock mode, wherein the mode-switching clutch device SOWC is configured, when being placed in the one-way mode, to transmit the drive force during forward running of the vehicle 10 in a driving state of the vehicle automatic transmission 23 and to cut off transmission of the drive force during the forward running in a driven state of the vehicle automatic transmission 23, and is configured, when being placed in the lock mode, to transmit the drive force during the running in the driving state and also during the running in the driven state. The mode-switching clutch device SOWC is to be placed, by a mode switching portion 41 constituted by, for example, hydraulic cylinders and disposed to be contiguous to the mode-switching clutch device SOWC in an axial direction of the counter shaft 50 (i.e., direction parallel to the axis of the counter shaft 50), in a selected one of the one-way mode and the lock mode which is selected depending on the running state of the vehicle 10. For example, with the first clutch C1 being placed in the engaged state and with the mode-switching clutch device SOWC being placed in the one-way mode, the drive force is transmittable through the mode-switching clutch device SOWC along the first drive-force transmitting path PT1 in the driving state in which the vehicle 10 runs in the forward direction by the drive force of the engine 12. That is, during the forward running of the vehicle 10, the drive force of the engine 12 is transmitted to the drive wheels 14 along the first drive-force transmitting path PT1. On the other hand, in the driven state, for example, during an inertia running of the vehicle 10, rotation transmitted from the drive wheels 14 is blocked by the mode-switching clutch device SOWC. It is noted that the driving state is a state in which a torque applied to the input shaft 22 takes a positive value so as to act on the input shaft 22 in a direction corresponding to a direction of the running of the vehicle 10, namely, practically, a state in which the vehicle 10 is driven by the drive force of the engine 12. It is further noted that the driven state is a state in which a torque applied to the input shaft 22 takes a negative value so as to act on the input shaft 22 in a direction opposite to the above-described direction corresponding to the direction of the running of the vehicle 10, namely, practically, a state in which the vehicle 10 is caused to run by an inertia with the input shaft 22 and the engine 12 being dragged by rotation transmitted from the drive wheels 14.

Further, in a state in which the mode-switching clutch device SOWC is in the lock mode with the first clutch C1 being in the engaged state, the drive force is enabled to be transmitted through the mode-switching clutch device SOWC in the driven state as well as in the driving state. In this state, the drive force of the engine 12 is transmitted to the drive wheels 14 along the first drive-force transmitting path PT1, and, in the driven state such as the inertia running, the rotation transmitted from the drive wheels 14 is transmitted to the engine 12 along the first drive-force transmitting path PT1 whereby the engine 12 is dragged to generate an engine brake. Further, in a state in which the mode-switching clutch device SOWC is in the lock mode with the first brake B1 being in the engaged state, the drive force of the engine 12 is transmitted to the drive wheels 14 through the mode-switching clutch device SOWC along the first drive-force transmitting path PT1 and acts on the drive wheels 14 so as to force the drive wheels 14 to be rotated in a direction that causes the vehicle 10 to run in the reverse direction. Thus, in this state, the vehicle 10 is enabled to run in the reverse direction with the drive force transmitted along the transmitting path PT1 to the drive wheels 14. The mode-switching clutch device SOWC has a construction that will be described later.

The first drive-force transmission path PT1 is established with the first clutch C1 (or the first brake B1) and the mode-switching clutch device SOWC being both engaged. With engagement of the first clutch C1, a forward-running drive-force transmission path is established. With the first brake B1 being engaged, a reverse-running drive-force transmission path is established. The first drive-force transmission path PT1 is a drive-force transmission path along which the drive force of the engine 12 is to be transmitted from the input shaft 22 to the output shaft 30 through the forward/reverse switching device 26 and the gear transmission mechanism 28. On the other hand, with the first clutch C1 and the first brake B1 being both released, the transmission of the drive force along the first drive-force transmission path PT1 is cut off, whereby the first drive-force transmission path PT1 is placed in its neutral state in which the transmission of the drive force along the first drive-force transmission path PT1 is cut off.

The gear transmission mechanism 28 is a gear transmission device provided in the first drive-force transmission path PT1. The first clutch C1, which is to be placed in the engaged state during the forward running, is the first engagement device disposed in series with the gear transmission device. It is also possible to interpret that the gear transmission mechanism 28 cooperates with the forward/reverse switching device 26 to constitute the gear transmission device. A forward gear ratio γgear, which is a gear ratio (=input rotational speed Nin/output rotational speed Nout) of the first drive-force transmission path PT1 during the forward running with the first clutch C1 being engaged, is dependent on the gear transmission mechanism 28. The first drive-force transmission path PT1 during the forward running is to be used when the vehicle 10 starts running. The forward gear ratio γgea is the highest gear ratio during the forward running. That is, the forward gear ratio γgea is set to be a value higher than a maximum gear ratio γmax of the continuously-variable transmission 24, which is the highest gear ratio in the second drive-force transmission path PT2. The value of the forward gear ratio γgear is suitable for start of running of the vehicle 10. It is noted that the input rotational speed Nin is a rotational speed of the input shaft 22 and that the output rotational speed Nout is a rotational speed of the output shaft 30.

The second drive-force transmission path PT2 is provided with the continuously-variable transmission 24 and the second clutch C2, and is a drive-force transmission path along which the drive force of the engine 12 is to be transmitted from the input shaft 22 to the drive wheels 14 through the continuously-variable transmission 24. In the second drive-force transmission path PT2, the continuously-variable transmission 24 and the second clutch C2 are arranged in series with each other in this order of description in a direction away from the input shaft 22 toward the output shaft 30. The continuously-variable transmission 24 includes a primary shaft 58 provided to be coaxial with the input shaft 22 and connected to the input shaft 22 in a drive-force transmittable manner, a primary pulley 60 disposed on the primary shaft 58 and having a variable effective diameter, a secondary shaft 62 provided to be coaxial with the output shaft 30, a secondary pulley 64 disposed on the secondary shaft 62 and having a variable effective diameter, and a transfer element in the form of a transmission belt 66 looped over or mounted on the pulleys 60, 64. The continuously variable transmission 24 is a known belt-type continuously-variable transmission in which the drive force is to be transmitted owing to a friction force generated between the transmission belt 66 and each of the pulleys 60, 64, and is configured to transmit the drive force of the engine 12 toward the drive wheels 14. In the continuously-variable transmission 24, a width of a V-shaped groove of each of the pulleys 60, 64 is changed whereby the effective diameter of each of the pulleys 60, 64, namely, a diameter of a mounted portion of each of the pulleys 60, 64 on which the transmission belt 66 is mounted, is changed, so that a gear ratio γcvt is changed. The width of the V-shaped groove (effective diameter) of the primary pulley 60 is changed by operation of a primary hydraulic actuator 60a, while the width of the V-shaped groove (effective diameter) of the secondary pulley 64 is changed by operation of a secondary hydraulic actuator 64a. Thus, the gear ratio γcvt and a belt clamping force are adjusted by the operations of the primary and secondary hydraulic actuators 60a, 64a.

The above-described gear ratio γcvt of the continuously-variable transmission 24 corresponds to the gear ratio in the second drive-force transmission path PT2. Thus, the drive force can be transmitted through the continuously-variable transmission 24 along the second drive-force transmission path PT2 at the gear ratio γcvt as a desired or arbitrary gear ratio that is changeable within a range between the highest gear ratio γmax (i.e., the lowest-speed gear) and the lowest gear ratio γmin (i.e., the highest-speed gear). The highest gear ratio γmax may be substantially equal to the forward gear ratio γgear in the first drive-force transmission path PT1. However, in the present embodiment, the highest gear ratio γmax is set to a value lower than the forward gear ratio γgear. The secondary pulley 64 is connected to the output shaft 30 through the second clutch C2 that is a second engagement device provided in series with the continuously-variable transmission 24 in the second drive-force transmission path PT2.

The output shaft 30 is disposed to be coaxial with the secondary shaft 62 and rotatable about an axis of the secondary shaft 62 relative to the secondary shaft 62. The second clutch C2 is disposed between the continuously-variable transmission 24 and the drive wheels 14, namely, between the secondary pulley 64 and the output shaft 30, in the second drive-force transmission path PT2, so as to selectively connect and disconnect a drive-force transmission path between the secondary pulley 64 and the output shaft 30. That is, the second drive-force transmission path PT2 is established with engagement of the second clutch C2. When the second drive-force transmission path PT2 is established, the automatic transmission 23 is placed in a drive-force transmittable state in which the drive force of the engine 12 is transmittable from the input shaft 22 to the output shaft 30 through the continuously-variable transmission 24. On the other hand, with the second clutch C2 being released, the transmission of the drive force along the second drive-force transmission path PT2 is cut off, whereby the second drive-force transmission path PT2 is placed in its neutral state in which the transmission of the drive force along the second drive-force transmission path PT2 is cut off.

The automatic transmission 23, which is constructed as described above, is capable of establishing a gear running mode and a belt running mode, wherein the drive force of the engine 12 is to be transmitted to the output shaft 30 along the first drive-force transmission path PT1 provided with the gear transmission mechanism 28, when the gear running mode is established in the automatic transmission 23, and wherein the drive force of the engine 12 is to be transmitted to the output shaft 30 along the second drive-force transmission path PT2 provided with the continuously-variable transmission 24, when the belt running mode is established in the automatic transmission 23. In the gear running mode, the forward running and the reverse running can be made, such that, when the first clutch C1 is engaged with the first brake B1 and the second clutch C2 being released, the forward running can be made irrespective of the mode of the mode-switching clutch device SOWC, and such that, when the first brake B1 is engaged with the first and second clutches C1, C2 being released, the reverse running can be made with the mode-switching clutch device SOWC being placed in the lock mode. On the other hand, in the belt running mode, which is established when the second clutch C2 is engaged with the first clutch C1 and the first brake B1 being released, only the forward running can be made.

The drive-force transmitting apparatus 16 includes a mechanical oil pump 44 that is connected to the pump impeller 20p. The oil pump 44 is to be driven or rotated by the engine 12, so as to supply, to a hydraulic control unit 46 provided in the vehicle 10, an original pressure of working hydraulic pressures for controlling shifting actions in the continuously-variable transmission 24, generating the belt clamping force in the continuously-variable transmission 24, controlling the operation state of each of the plurality of engagement devices C1, C2, B1, SOWC of the automatic transmission 23 so as to switch between, for example, the released and engaged states, and controlling the operation state of the lockup clutch LU so as to switch between the released and engaged states.

Figure 2:
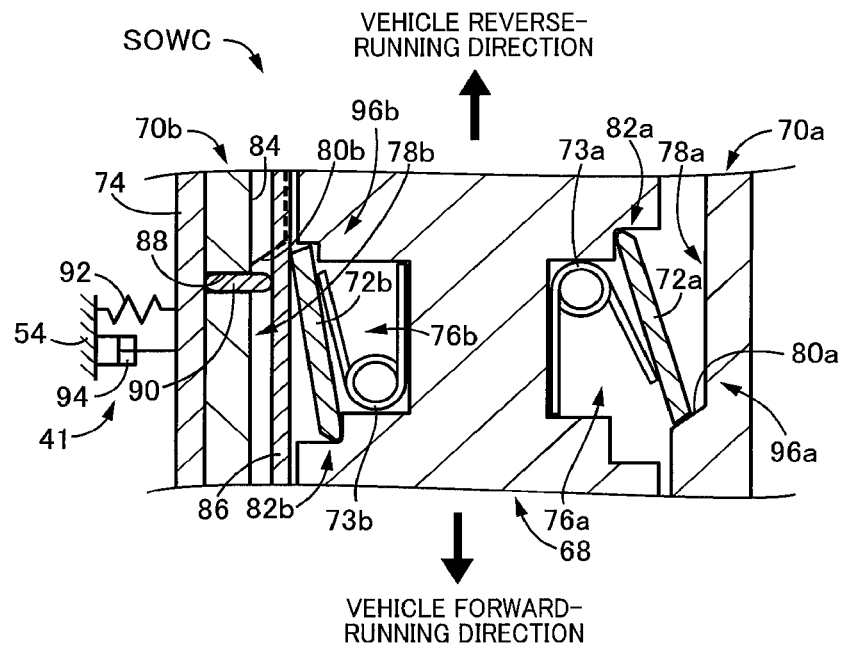
FIG. 2 is a view schematically showing of a construction of a mode-switching clutch device SOWC shown in FIG. 1, wherein the view is a cross sectional view of a circumferential portion of the mode-switching clutch device SOWC, in a state in which the mode-switching clutch device SOWC is placed in its one-way mode.
Figure 3:
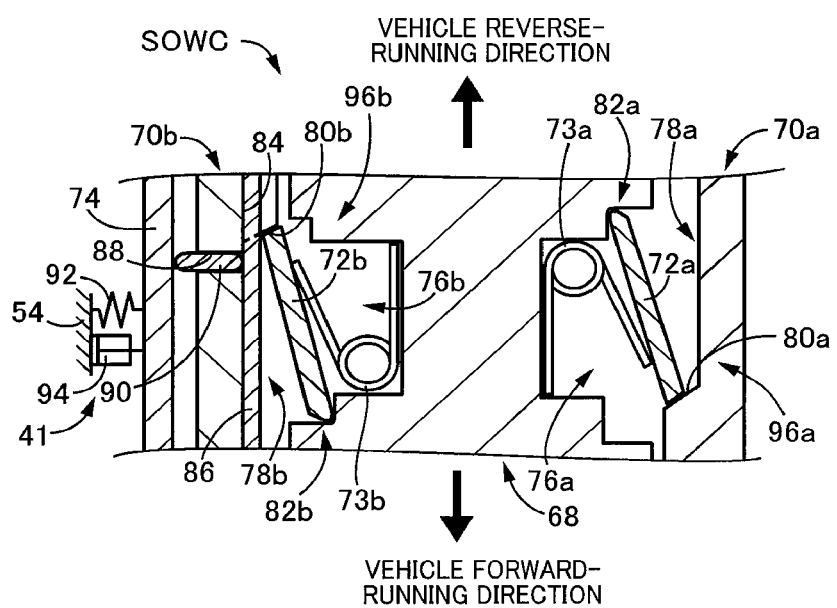
FIG. 3 is a view schematically showing of the construction of the mode-switching clutch device SOWC shown in FIG. 1, wherein the view is a cross sectional view of the circumferential portion of the mode-switching clutch device SOWC, in a state in which the mode-switching clutch device SOWC is placed in its lock mode.

Each of FIGS. 2 and 3 is a view schematically showing a construction of the mode-switching clutch device SOWC, wherein the view is a cross sectional view of a circumferential portion of the mode-switching clutch device SOWC, and the cross sectional view is a development of a cylindrical plane whose center lies on an axis of the counter shaft 50. FIG. 2 shows a state in which the mode-switching clutch device SOWC is placed in the one-way mode. FIG. 3 shows a state in which the mode-switching clutch device SOWC is placed in the lock mode. In each of FIGS. 2 and 3, a vertical direction on the drawing sheet corresponds to a circumferential direction of the mode-switching clutch device SOWC, an upward direction on the drawing sheet corresponds to a vehicle reverse-running direction (i.e., direction of rotation for reverse running of the vehicle 10) and a downward direction on the drawing sheet corresponds to a vehicle forward-running direction (i.e., direction of rotation for forward running of the vehicle 10). Further, in each of FIGS. 2 and 3, a horizontal direction on the drawing sheet corresponds to the axial direction of the counter shaft 50 (hereinafter, the term "axial direction" means the axial direction of the counter shaft 50 unless otherwise specified), a rightward direction on the drawing sheet corresponds to a direction toward the large-diameter gear 52 shown in FIG. 1, and a leftward direction on the drawing sheet corresponds to a direction toward the drive gear 54 shown in FIG. 1.

The mode-switching clutch device SOWC has generally a disk shape, and is disposed radially outside the counter shaft 50 so as to be coaxial with the counter shaft 50. The mode-switching clutch device SOWC includes an input-side rotary member 68, first and second output-side rotary members 70a, 70b that are disposed to be adjacent to the input-side rotary member 68 so as to be disposed on respective opposite sides of the input-side rotary member 68 in the axial direction, a plurality of first struts 72a and a plurality of first torsion-coil springs 73a that are interposed between the input-side rotary member 68 and the first output-side rotary member 70a in the axial direction, and a plurality of second struts 72b and a plurality of second torsion-coil springs 73b that are interposed between the input-side rotary member 68 and the second output-side rotary member 70b in the axial direction.

The input-side rotary member 68 has generally a disk shape, and is rotatable relative to the counter shaft 50 about the axis of the counter shaft 50. The input-side rotary member 68 is disposed between the first and second output-side rotary members 70a, 70b in the axial direction. The input-side rotary member 68 is formed integrally with the large-diameter gear 52, for example, such that teeth of the larger-diameter gear 52 are disposed radially outside the input-side rotary member 68. The input-side rotary member 68 is connected to the engine 12, in a drive-force transmittable manner, through the gear transmission mechanism 28, forward/reverse switching device 26 and input shaft 22, for example.

The input-side rotary member 68 has, in its axial end surface that is opposed to the first output-side rotary member 70a in the axial direction, a plurality of first receiving portions 76a in which the first struts 72a and the first torsion-coil springs 73a are received. The first receiving portions 76a are equi-angularly spaced apart from each other in a circumferential direction of the input-side rotary member 68. Further, the input-side rotary member 68 has, in another axial end surface thereof that is opposed to the second output-side rotary member 70b in the axial direction, a plurality of second receiving portions 76b in which the second struts 72b and the second torsion-coil springs 73b are received. The second receiving portions 76b are equi-angularly spaced apart from each other in the circumferential direction of the input-side rotary member 68. The first and second receiving portions 76a, 76b are substantially aligned in a radial direction of the input-side rotary member 68, namely, disposed on a common circumference.

The first output-side rotary member 70a has generally a disk-shaped, and is rotatable about the axis of the counter shaft 50. The first output-side rotary member 70a is fixed to the counter shaft 50 unrotatably relative to the counter shaft 50, so as to be rotated integrally with the counter shaft 50. The first output-side rotary member 70a is connected to the drive wheels 14, in a drive-force transmittable manner, through the counter shaft 50, drive gear 54, driven gear 56, output shaft 30 and differential gear device 38, for example.

The first output-side rotary member 70a has, in its surface that is opposed to the input-side rotary member 68 in the axial direction, a plurality of first recessed portions 78a each of which is recessed in a direction away from the input-side rotary member 68. The first recessed portions 78a, whose number is the same as the first receiving portions 76a, are equi-angularly spaced apart from each other in the circumferential direction. The first recessed portions 78a are substantially aligned with the first receiving portions 76a provided in the input-side rotary member 68, in a radial direction of the first output-side rotary member 70a. That is, the first recessed portions 78a and the first receiving portions 76a are disposed on a common circumference. Therefore, when each of the first receiving portions 76a is aligned with one of the first recessed portions 78a in the circumferential direction, namely, when a rotational position of each of the first receiving portions 76a coincides with that of one of the first recessed portions 78a, the first receiving portion 76a and the first recessed portion 78a are opposed to and adjacent with each other in the axial direction. Each of the first recessed portions 78a has a shape by which a longitudinal end portion of any one of the first struts 72a can be received in the first recessed portion 78a. Further, each of the first recessed portions 78a has, in its circumferential end, a first wall surface 80a with which the longitudinal end portion of one of the first struts 72a is to be in contact, when the input-side rotary member 68 is rotated in the above-described vehicle forward-running direction (corresponding to the downward direction on the drawing sheet of each of FIGS. 2 and 3) relative to the output-side rotary members 70, by the drive force of the engine 12.

Each of the first struts 72a is constituted by a plate-like member having a predetermined thickness, and is elongated in the circumferential direction (corresponding to the vertical direction on the drawing sheet of FIGS. 2 and 3), as shown in the cross sectional views of FIGS. 2 and 3. Further, each of the first struts 72a has a predetermined dimension as measured in a direction perpendicular to the drawing sheet of FIGS. 2 and 3.

The longitudinal end portion of each of the first struts 72a is constantly forced or biased, by a corresponding one of the first torsion-coil springs 73a, toward the first output-side rotary member 70a. Further, each of the first struts 72a is in contact at another longitudinal end portion thereof with a first stepped portion 82a provided in a corresponding one of the first receiving portions 76a, such that the first strut 72a is pivotable about the other longitudinal end portion thereof that is in contact with the first stepped portion 82a. Each of the first torsion-coil springs 73a is interposed between a corresponding one of the first struts 72a and the input-side rotary member 68, and constantly forces or biases the longitudinal end portion of the corresponding one of the first struts 72a toward the first output-side rotary member 70a.

Owing to the above-described construction, in a state in which the mode-switching clutch device SOWC is placed in either the one-way mode or the lock mode, when the input-side rotary member 68 receives the drive force which is transmitted from the engine 12 and which acts in the vehicle forward-running direction, each of the first struts 72a is in contact at the longitudinal end portion with the first wall surface 80a of the first output-side rotary member 70a and is in contact at the other longitudinal end portion with the first stepped portion 82a of the input-side rotary member 68, so that the input-side rotary member 68 and the first output-side rotary member 70a are inhibited from being rotated relative to each other whereby the drive force acting in the vehicle forward-running direction is transmitted to the drive wheels 14 through the mode-switching clutch device SOWC. Further, in a case in which the input-side rotary member 68 receives the drive force which is transmitted from the engine 12 and which acts in the vehicle reverse-running direction, and in a case in which the vehicle automatic transmission 23 is placed into the driven state during the forward running of the vehicle 10, the longitudinal end portion of each of the first struts 72a is separated from the first wall surface 80a, so that the input-side rotary member 68 and the first output-side rotary member 70a are allowed to be rotated relative to each other whereby the transmission of the drive force between the input-side rotary member 68 and the first output-side rotary member 70a is cut off. The above-described first struts 72a, first torsion-coil springs 73a, first receiving portions 76a and first recessed portions 78a (each defining the first wall surface 80a) cooperate to constitute a first one-way clutch 96a that is configured to transmit the drive force acting in the vehicle forward-running direction, to the drive wheels 14, and to cut off transmission of the drive force acting in the vehicle reverse-running direction.

The second output-side rotary member 70b has generally a disk-shaped, and is rotatable about the axis of the counter shaft 50. The second output-side rotary member 70b is fixed to the counter shaft 50 unrotatably relative to the counter shaft 50, so as to be rotated integrally with the counter shaft 50. The second output-side rotary member 70b is connected to the drive wheels 14, in a drive-force transmittable manner, through the counter shaft 50, drive gear 54, driven gear 56, output shaft 30 and differential gear device 38, for example.

The second output-side rotary member 70b has, in its surface that is opposed to the input-side rotary member 68 in the axial direction, a plurality of second recessed portions 78b each of which is recessed in a direction away from the input-side rotary member 68. The second recessed portions 78b, whose number is the same as the second receiving portions 76b, are equi-angularly spaced apart from each other in the circumferential direction. The second recessed portions 78b are substantially aligned with the second receiving portions 76b provided in the input-side rotary member 68, in a radial direction of the second output-side rotary member 70b. That is, the second recessed portions 78b and the second receiving portions 76b are disposed on a common circumference. Therefore, when each of the second receiving portions 76b is aligned with one of the second recessed portions 78b in the circumferential direction, namely, when a rotational position of each of the second receiving portions 76b coincides with that of one of the second recessed portions 78b, the second receiving portion 76b and the second recessed portion 78b are opposed to and adjacent with each other in the axial direction. Each of the second recessed portions 78b has a shape by which a longitudinal end portion of any one of the second struts 72b can be received in the second recessed portion 78b. Further, each of the second recessed portions 78b has, in its circumferential end, a second wall surface 80b with which the longitudinal end portion of one of the second struts 72b is to be in contact, in a case in which the mode-switching clutch device SOWC is placed in the lock mode as shown in FIG. 3, when the input-side rotary member 68 is rotated by the drive force of the engine 12 in the above-described vehicle reverse-running direction (corresponding to the upward direction on the drawing sheet of each of FIGS. 2 and 3) relative to the output-side rotary members 70, and when the vehicle automatic transmission 23 is placed into the driven state by, for example, an inertia running during the forward running of the vehicle 10.

Each of the second struts 72b is constituted by a plate-like member having a predetermined thickness, and is elongated in the circumferential direction (corresponding to the vertical direction on the drawing sheet of FIGS. 2 and 3), as shown in the cross sectional views of FIGS. 2 and 3. Further, each of the second struts 72b has a predetermined dimension as measured in a direction perpendicular to the drawing sheet of FIGS. 2 and 3.

The longitudinal end portion of each of the second struts 72b is constantly forced or biased, by a corresponding one of the second torsion-coil springs 73b, toward the second output-side rotary member 70*b*. Further, each of the second struts 72*b* is in contact at another longitudinal end portion thereof with a second stepped portion 82*b* provided in a corresponding one of the second receiving portions 76*b*, such that the second strut 72*b* is pivotable about the other longitudinal end portion thereof that is in contact with the second stepped portion 82*b*. Each of the second torsion-coil springs 73*b* is interposed between a corresponding one of the second struts 72*b* and the input-side rotary member 68, and constantly forces or biases the longitudinal end portion of the corresponding one of the second struts 72*b* toward the second output-side rotary member 70*b*.

Owing to the above-described construction, in a state in which the mode-switching clutch device SOWC is placed in the lock mode as shown in FIG. 3, when the input-side rotary member 68 receives the drive force which is transmitted from the engine 12 and which acts in the vehicle reverse-running direction, each of the second struts 72*b* is in contact at the longitudinal end portion with the second wall surface 80*b* of the second output-side rotary member 70*b* and is in contact at the other longitudinal end portion with the second stepped portion 82*b* of the input-side rotary member 68, so that the input-side rotary member 68 and the second output-side rotary member 70*a* are inhibited from being rotated relative to each other whereby the drive force acting in the vehicle reverse-running direction is transmitted to the drive wheels 14 through the mode-switching clutch device SOWC. Further, even when the vehicle automatic transmission 23 is placed into the driven state during forward running of the vehicle 10, each of the second struts 72*b* is in contact at the longitudinal end portion with the second wall surface 80*b* of the second output-side rotary member 70*b* and is in contact at the other longitudinal end portion with the second stepped portion 82*b* of the input-side rotary member 68, whereby the drive force transmitted from the drive wheels 14 is transmitted through the mode-switching clutch device SOWC toward the engine 12. Still further, in a case in which the input-side rotary member 68 receives the drive force which is transmitted from the engine 12 and which acts in the vehicle forward-running direction, the longitudinal end portion of each of the second struts 72*b* is separated from the second wall surface 80*b* of the second output-side rotary member 70*b*, so that the input-side rotary member 68 and the second output-side rotary member 70*b* are allowed to be rotated relative to each other whereby the transmission of the drive force between the input-side rotary member 68 and the second output-side rotary member 70*b* is cut off. The above-described second struts 72*b*, second torsion-coil springs 73*b*, second receiving portions 76*b* and second recessed portions 78*b* (each defining the second wall surface 80*b*) cooperate to constitute a second one-way clutch 96*b* that is configured to transmit the drive force acting in the vehicle reverse-running direction, to the drive wheels 14, and to cut off transmission of the drive force acting in the vehicle forward-running direction.

Further, the second output-side rotary member 70*b* has a plurality of through-holes 88 that pass through the second output-side rotary member 70*b* in the axial direction. Each of the through-holes 88 is disposed in a position that overlaps with a corresponding one of the second recessed portions 78*b* as seen in the axial direction of the counter shaft 50, so that each of the through-holes 88 is in communication at its end with a corresponding one of the second recessed portions 78*b*. A cylindrical-shaped pin 90 is received in each of the through-holes 88, and is slidable in the through-hole 88. The pin 90 is in contact at one of its axially opposite ends with a pressing plate 74 that consti-
tutes a part of the mode switching portion 41, and is in contact at the other of its axially opposite ends with an annular ring 86 that includes a plurality of portions that are disposed in the respective second recessed portions 78*b* in the circumferential direction. The ring 86 is fitted in a plurality of arcuate-shaped grooves 84, each of which is provided in the second output-side rotary member 70*b* and interconnects between a corresponding adjacent pair of the second recessed portions 78*b* that are adjacent to each other in the circumferential direction. The ring 86 is movable relative to the second output-side rotary member 70*b* in the axial direction.

The mode switching portion 41 is provided to be coaxial with the counter shaft 50 and disposed on an outer peripheral side of the counter shaft 50. The mode switching portion 41 is located on one of opposite sides of the second output-side rotary member 70*b* which is remote from the input-side rotary member 68 in the axial direction of the counter shaft 50, and is located in a position adjacent to the second output-side rotary member 70*b* in the axial direction of the counter shaft 50. The mode switching portion 41 includes, in addition to the above-described pressing plate 74, a plurality of springs (compression coil springs) 92 interposed between the drive gear 54 and the pressing plate 74 in the axial direction, and a hydraulic chamber 94 that is configured to receive the working fluid so as to generate a thrust by which the pressing plate 74 is to be moved toward the drive gear 54 in the axial direction.

The pressing plate 74 has generally a disk shape, and is disposed to be movable relative to the counter shaft 50 in the axial direction. The pressing plate 74 is constantly forced or biased by the spring 92 toward the second output-side rotary member 70*b* in the axial direction. Therefore, in a state in which the working fluid is not supplied to the hydraulic chamber 94 of the mode switching portion 41, the pressing plate 74 is moved, by biasing force of the spring 92, toward the second output-side rotary member 70*b* in the axial direction, whereby the pressing plate 74 is in contact with the second output-side rotary member 70*b*, as shown in FIG. 2. In this state, the pins 90, the ring 86 and the longitudinal end portion of each of the second struts 72*b* are moved toward the input-side rotary member 68 in the axial direction, as shown in FIG. 2, whereby the longitudinal end portion of each of the second struts 72*b* becomes unable to be bought into engagement with the second wall surface 80*b* of the second recessed portions 78*b*. Thus, the second one-way clutch 96*b* is placed in its released state in which the second one-way clutch 96*b* does not serve as the one-way clutch, so that the mode-switching clutch device SOWC is placed in the one-way mode in which only the first one-way clutch 96*a* serves as the one-way clutch.

On the other hand, in a state in which the working fluid is supplied to the hydraulic chamber 94 of the mode switching portion 41, the pressing member 74 is moved, against the biasing force of the spring 92, toward the drive gear 54 in the axial direction, so as to be separated from the second output-side rotary member 70*b*. In this state, the pins 90, the ring 86 and the longitudinal end portion of each of the second struts 72*b* are moved, by the biasing force of the second torsion-coil springs 73*b*, toward the drive gear 54 in the axial direction, as shown in FIG. 3, whereby the longitudinal end portion of each of the second struts 72*b* becomes able to be bought into engagement with the second wall surface 80*b* of the second recessed portions 78*b*. Thus, the second one-way clutch 96*b* is placed in its engaged state in which the second one-way clutch 96*b* serves as the one-way clutch, so that the mode-switching clutch device SOWC is placed in the lock mode in which both of the first one-way clutch 96a and the second one-way clutch 96b serves as the one-way clutches.

FIG. 4 is a table indicating a relationship between each of a plurality of ranges of the automatic transmission 23 selected by operation of a shift lever 98 as a shift switching device provided in the vehicle 10 and the operation state of each of the engagement devices C1, C2, B1, SOWC provided in the automatic transmission 23. Each of the ranges of the automatic transmission 23 is a drive-force transmission state of the automatic transmission 23, which is to be switched, by the electronic control apparatus 100, in accordance with a selected one of operation positions POSsh of the shift lever 98. The shift lever 98 can be placed in any one of the operation positions POSsh consisting of P position, R position, N position, D position and M position. When the shift lever 98 is placed in the P position, P range is selected for parking. When the shift lever 98 is placed in the R position, R range is selected for the reverse running. When the shift lever 98 is placed in the N position, N range is selected for cutting off the transmission of the drive force. When the shift lever 98 is placed in the D position, D range is selected for the forward running. When the shift lever 98 is placed in the M position, M range is selected for enabling manual shift operations. In FIG. 4, "C1" represents the first clutch C1, "C2" represents the second clutch C2, "B1" represents the first brake B1, and "SOWC" represents the mode-switching clutch device SOWC. Further, in FIG. 4, "O" in the first clutch C1, second clutch C2 or first brake B1 indicates its engaged state, and blank in the first clutch C1, second clutch C2 or first brake B1 indicates its released state. Still further, in FIG. 4, "O" in the mode-switching clutch device SOWC indicates its lock mode, and blank in the mode-switching clutch device SOWC indicates its one-way mode.

For example, when the shift lever 98 is placed in the P position as one of the operation positions POSsh whereby the P range is selected, and when the shift lever 98 is placed in the N position as one of the operation positions POSsh whereby the N range is selected, the first clutch C1, second clutch C2 and first brake B1 are all placed in the released positions, as indicated in FIG. 4, so that the first and second drive-force transmission paths PT1, PT2 are both placed in the neutral states in which the drive force is not transmitted along the first and second drive-force transmission paths PT1, PT2.

Further, when the shift lever 98 is placed in the R position as one of the operation positions POSsh whereby the R range is selected, the first brake B1 is placed in the engaged state and the mode-switching clutch device SOWC is placed in the lock mode, as indicated in FIG. 4. With the first brake B1 being placed in the engaged state, the drive force acting in the vehicle reverse-running direction is transmitted from the engine 12 to the gear transmission mechanism 28. In this instance, if the mode-switching clutch device SOWC is in the one-way mode, the drive force is blocked by the mode-switching clutch device SOWC so that reverse running cannot be made. Thus, with the mode-switching clutch device SOWC being placed in the lock mode, the drive force acting in the vehicle reverse-running direction is transmitted toward the output shaft 30 through the mode-switching clutch device SOWC so that reverse running can be made. When the shift lever 98 is placed in the R position whereby the R range is selected, the first brake B1 is placed in the engaged state and the mode-switching clutch device SOWC is placed in the lock mode, so that a reverse gear position is established to transmit the drive force acting in the vehicle reverse-running direction, through the gear transmission mechanism 28 along the first drive-force transmitting path PT1, to the drive wheels 14.

When the shift lever 98 is placed in the D position as one of the operation positions POSsh whereby the D range is selected, the first clutch C1 is placed in the engaged state or the second clutch C2 is placed in the engaged state, as indicated in FIG. 4. In FIG. 4, "D1" and "D2" represent a D1 range and a D2 range, respectively. When the shift lever 98 is placed in the D position so as to establish the D range, the first clutch C1 or the second clutch C2 is engaged. That is, one of the D1 range and the D2 range is selected depending the running state of the vehicle 10, and the selected one is automatically established. The D1 range is established when the vehicle running speed is within a relatively low speed range including zero speed (vehicle stop). The D2 range is established when the vehicle running speed is within a relatively high speed range including a middle speed range. For example, during the running of the vehicle 10 in the D range with the shift lever 98 being placed in the drive position D, when the running state of the vehicle 10 is changed from the low speed range to the high speed range, the D1 range is automatically switched to the D2 range.

For example, when the running state of the vehicle 10 is in a speed range corresponding to the D1 range, the first clutch C1 is engaged and the second clutch C2 is released. In this case, the gear running mode is established whereby the drive force acting in the vehicle forward-running direction is transmitted from the engine 12 to the drive wheels 14 along the first drive-force transmitting path PT1 through the gear transmission mechanism 28, and a first gear position 1st of the forward gear ratio γgear is established. That is, a first gear ratio γ1 as the gear ratio of the first gear position 1st is the forward gear ratio γgear. Further, when the running state of the vehicle 10 is in a speed range corresponding to the D2 range, the first clutch C1 is released and the second clutch C2 is engaged. In this case, the belt running mode is established whereby the drive force acting in the vehicle forward-running direction is transmitted from the engine 12 to the drive wheels 14 along the second drive-force transmitting path PT2 through the continuously variable transmission 24. In the belt running mode, a second gear position 2nd providing a second gear ratio γ2 which is within a gear ratio range γmax-γmin (within which the gear ratio γcvt of the continuously-variable transmission 24 is variable) and which is lower than the above-described forward gear ratio γgear, is established, and a shifting control operation is executed within a range between the second gear ratio γ2 and the lowest gear ratio γmin. Thus, when the shift lever 98 is placed into the drive position D as one of the operation positions POSsh whereby the D range is selected, one of the D1 range of the gear running mode and the D2 range of the belt running mode is established depending on the running state of the vehicle 10, such that the drive force of the engine 12 is transmitted to the drive wheels 14 along the first drive-force transmitting path PT1 when the D1 range is established, and such that drive force of the engine 12 is transmitted to the drive wheels 14 along the second drive-force transmitting path PT2 when the D2 range is established.

When the shift lever 98 is placed in the M position as one of the operation positions POSsh whereby the M range is established, a shift-up operation or a shift-down operation can be executed by a manual operation made by the vehicle driver. That is, the M position is a manual shift position in which a shifting operation can be made by the manual operation made by the vehicle driver. For example, in a state in which the M range is established with the shift lever 98 being placed in the M position, when the vehicle driver executes an operation, through the shift lever 98 or an up/down switch (not shown) or the like, requesting execution of the shift-down operation, the first clutch C1 is engaged and the mode-switching clutch device SOWC is placed into the lock mode, whereby the M1 range of the gear running mode is established. In the M1 range, the first gear position 1st is established, and the transmission of the drive force is enabled by the placement of the mode-switching clutch device SOWC in the lock mode both in the driving state and the driven state. For example, during the inertia running of the vehicle 10 during which the automatic transmission 23 is placed in the driven state in which rotation is transmitted from the drive wheels 14 to the automatic transmission 23, in the M1 range, the rotation transmitted from the drive wheels 14 is transmitted through the mode-switching clutch device SOWC toward the engine 12, so that the engine 12 is dragged whereby the engine brake can be generated.

Further, in the state in which the M range is established with the shift lever 98 being placed in the M position, when the vehicle driver executes an operation, through the shift lever 98 or the up/down switch (not shown) or the like, requesting execution of the shift-up operation, the second clutch C2 is engaged whereby the M2 range is established. In the M2 range, as in the above-described D2 range, the belt running mode is established whereby the drive force of the engine 12 is to be transmitted toward the drive wheels 14 along the second drive-force transmission path PT2. That is, in response to the operation executed by the vehicle driver, the shift-up operation is executed to establish the second gear position 2nd providing the second gear ratio γ2, and the shifting control operation is executed within the range between the second gear ratio γ2 and the lowest gear ratio γmin. Thus, in the state in which the M range is established with the shift lever 98 being placed in the M position as one of the operation positions POSsh, it is possible to execute the manual shift operation for switching from one of the M1 range of the gear running mode and the M2 range of the belt running mode, to another by the manual operation executed by the vehicle driver, wherein the drive force of the engine 12 is to be transmitted toward the drive wheels 14 along the first drive-force transmission path PT1 and the engine brake is generable, when the M1 range is established, and wherein the drive force of the engine 12 is to be transmitted toward the drive wheels 14 along the second drive-force transmission path PT2, when the M2 range is established.

Referring back to FIG. 1, the vehicle 10 is provided with the electronic control apparatus 100 as a controller including functions of a shift control apparatus for the automatic transmission 23. For example, the electronic control apparatus 100 includes a so-called microcomputer incorporating a CPU, a RAM, a ROM and an input-output interface. The CPU performs various control operations in the vehicle 10, by processing various input signals, according to control programs stored in the ROM, while utilizing a temporary data storage function of the RAM. The electronic control apparatus 100 is configured to perform, for example, an engine control operation for controlling an output of the engine 12, a shifting control operation and a belt-clamping-force control operation for the continuously-variable transmission 24, and a hydraulic-pressure control operation for switching the operation state of each of the plurality of engagement devices (C1, B1, C2, SOWC). The electronic control apparatus 100 may be constituted by two or more control units exclusively assigned to perform different control operations such as the engine control operation and the hydraulic-pressure control operation.

The electronic control apparatus 100 receives various input signals based on values detected by respective sensors provided in the vehicle 10. Specifically, the electronic control apparatus 100 receives: an output signal of an engine speed sensor 102 indicative of an engine rotational speed Ne which is a rotational speed of the engine 12; an output signal of a primary speed sensor 104 indicative of a primary rotational speed Npri which is a rotational speed of the primary shaft 58 which is equivalent to an input-shaft rotational speed Nin; an output signal of a secondary speed sensor 106 indicative of a secondary rotational speed Nsec which is a rotational speed of the secondary shaft 62; an output signal of an output speed sensor 108 indicative of an output-shaft rotational speed Nout which is a rotational speed of the output shaft 30 and which corresponds to the running speed V of the vehicle 10; an output signal of an input speed sensor 109 indicative of an input rotational speed Nsowc which is a rotational speed of the input-side rotary member 68 of the mode-switching clutch device SOWC; an output signal of an accelerator-operation amount sensor 110 indicative of an operation amount θacc of the accelerator pedal 45 which represents an amount of accelerating operation made by the vehicle driver; an output signal of a throttle-opening degree sensor 112 indicative of a throttle opening degree tap of an electronic throttle device; an output signal of a shift position sensor 114 indicative of an operation position POSsh of the shift switching device in the form of the shift lever 98 provided in the vehicle 10; and an output signal of a fluid temperature sensor 116 indicative of a working fluid temperature THoil that is a temperature of a working fluid in the hydraulic control unit 46. It is noted that the input-shaft rotational speed Nin (=primary rotational speed Npri) is equivalent to a turbine rotational speed NT that is an output speed of the torque converter 20.

Further, the electronic control apparatus 100 generates various output signals which are supplied to various devices such as the engine control device 42 and the hydraulic control unit 46 and which include an engine-control command signal Se for controlling the engine 12, a hydraulic control command signal Scvt for performing hydraulic controls such as controls of the shifting action and the belt clamping force of the continuously-variable transmission 24, a hydraulic-control command signal Scbs for performing hydraulic controls of operation states of the plurality of engagement devices C1, C2, B1, SOWC and a hydraulic-control command signal Slu for performing hydraulic controls of an operation state of the lock-up clutch LU.

The hydraulic control unit 46, which receives the above-described hydraulic control command signals, outputs a C1 hydraulic pressure Pc1 that is supplied to the hydraulic actuator of the first clutch C1, a C2 hydraulic pressure Pc2 that is supplied to the hydraulic actuator of the second clutch C2, a B1 hydraulic pressure Pb1 that is supplied to the hydraulic actuator of the first brake B1, an SOWC hydraulic pressure Psowc that is supplied to the hydraulic chamber 94 of the mode switching portion 41 of the mode-switching clutch device SOWC, a primary pressure Ppri that is supplied to the primary hydraulic actuator 60a of the primary pulley 60, a secondary pressure Psec that is supplied to the secondary hydraulic actuator 64a of the secondary pulley 64, and a lockup-clutch pressure Plu that is supplied for controlling the lock-up clutch LU. Each of the C1 hydraulic pressure Pc1, C2 hydraulic pressure Pc2, B1 hydraulic pressure Pb1, SOWC hydraulic pressure Psowc, primary pressure Ppri, secondary pressure Psec and lockup-clutch pressure Plu is controlled directly or indirectly by a corresponding one of electromagnetic valves (not shown) provided in the hydraulic control unit 46. It is noted that the C1 hydraulic pressure Pc1 corresponds to an engaging torque of the first clutch C1, the C2 hydraulic pressure Pc2 corresponds to an engaging torque of the second clutch C2 and the B1 hydraulic pressure PIA corresponds to an engaging toque of the first brake B1.

The electronic control apparatus 100 functionally includes an engine control portion 120, a running-mode switch control portion 122, a CVT shift control portion 126 and a lockup-clutch control portion 128, for executing various control operations in the vehicle 10.

The engine control portion 120 outputs the engine control command signal Se so as to control the throttle opening degree tap and a fuel injection amount, for example, such that the torque Te of the engine 12 is increased and reduced depending on the acceleration operation amount θacc. The engine control portion 120 may control the engine 12 in various manners. For example, the engine control portion 120 calculates the required drive force Fdem, based on the acceleration operation amount θacc and the running speed V, and determines a target engine torque TEtgt that provides the required drive force Fdem, so that the engine control portion 120 controls the engine 12 such that the target engine torque TEtgt is obtained.

During the forward running in the D range or M range, the running-mode switch control portion 122 executes a running-mode switch control operation for switching between the gear running mode using the first drive-force transmission path PT1 and the belt running mode using the second drive-force transmission path PT2. In other words, the running-mode switch control portion 122 executes a shift operation between the D1 range and the D2 range in the D range, and executes a shift operation between the M1 range and M2 range in the M range. The forward gear ratio γgear of the gear running mode is the first gear ratio γ1 as the gear ratio of the first gear position 1st in the automatic transmission 23. Meanwhile, the highest gear ratio within the gear ratio range (within which the gear ratio γcvt is variable) during forward running of the vehicle 10 in the belt running mode is the second gear ratio γ2 as the gear ratio of the second gear position 2nd in the automatic transmission 23. The second gear ratio γ2 may be the highest gear ratio γmax that is lower than the forward gear ratio γgear of the gear running mode. However, in the present embodiment, the second gear ratio γ2 is a predetermined value which is still lower than the highest gear ratio γmax and which is suitable for a stepped shift-up action from the first gear position 1st to the second gear position 2nd.

In the D range, the switching between the gear running mode (D1 range) and the belt running mode (D2 range) is made in accordance with, for example, a shifting line in a shift map of a normal step-variable transmission, wherein the shifting line is a line representing a boundary between the first gear position 1st and the second gear position 2nd. The shift map is defined, for example, based on the acceleration operation amount θacc and the vehicle running speed V, such that a shift-up operation from the first gear position 1st to the second gear position 2nd is executed, for example, when the acceleration operation amount θacc is reduced and the running speed V is increased, and such that a shift-down operation from the second gear position 2nd to the first gear position 1st is executed, for example, when the acceleration operation amount θacc is increased and the running speed V is reduced. That is, the gear running mode is established during running of the vehicle 10 at a low speed, for example, upon start of the running, and the belt running mode is established during running of the vehicle 10 at a certain speed or higher. For example, when the shift-up operation is to be executed from the first gear position 1st of the gear running mode to the second gear position 2nd of the belt running mode, the hydraulic control command signal Scbs is outputted to execute a clutch-to-clutch shifting operation for releasing and engaging the first clutch C1 and the second clutch C2, respectively, in a state in which the variable gear ratio γcvt of the continuously-variable transmission 24 is set to the second gear ratio γ2. Further, when the shift-down operation is to be executed from the second gear position 2nd of the belt running mode to the first gear position 1st of the gear running mode, the hydraulic control command signal Scbs is outputted to execute a clutch-to-clutch shifting operation for releasing and engaging the second clutch C2 and the first clutch C1, respectively. In the D range, since the mode-switching clutch device SOWC is placed in the one-way mode in the D1 range of the gear running mode, as shown in FIG. 4, the engine brake is not generated during the running of the vehicle 10 in the driven state with the D1 range, i.e., the first gear position 1st being established.

On the other hand, in the M range, the switching between the gear running mode (M1 range) and the belt running mode (M2 range) is made in accordance with a shift-up request or a shift-down request made by a manual shift operation executed by the vehicle driver. This mode switching is also executed by the normal clutch-to-clutch shifting operation, as in the mode switching in the D range. That is, when the shift-up operation is to be executed from the first gear position 1st of the gear running mode to the second gear position 2nd of the belt running mode, the hydraulic control command signal Scbs is outputted to execute the clutch-to-clutch shifting operation for releasing and engaging the first clutch C1 and the second clutch C2, respectively, in the state in which the variable gear ratio γcvt of the continuously-variable transmission 24 is set to the second gear ratio γ2. Further, when the shift-down operation is to be executed from the second gear position 2nd of the belt running mode to the first gear position 1st of the gear running mode, the hydraulic control command signal Scbs is outputted to execute the clutch-to-clutch shifting operation for releasing and engaging the second clutch C2 and the first clutch C1, respectively. In the M range, since the mode-switching clutch device SOWC is placed in the lock mode in the M1 range of the gear running mode, as shown in FIG. 4, the engine 12 is forcibly rotated depending on the running speed V whereby the engine brake is generated during the running of the vehicle 10 in the driven state with the M1 range, i.e., the first gear position 1st being established.

In the belt running mode in the D range and the M range, namely, in the D2 range or the M2 range shown in FIG. 4, the CVT shift control portion 126 executes a shifting control operation in the continuously-variable transmission 24. In this shifting control operation, a target input rotational speed Nintgt is calculated in accordance with a predetermined shift map, based on operation states such as the acceleration operation amount θacc and the running speed V, and the hydraulic control command signal Scvt is outputted to increase or reduce the gear ratio γcvt of the continuously-variable transmission 24 such that an actual input rotational speed Nin becomes equal to the calculated target input rotational speed Nintgt. Specifically, the gear ratio γcvt of the continuously-variable transmission 24 is controlled, for example, such that the gear ratio γcvt is increased with increase of the acceleration operation amount θacc and with reduction of the running speed V, namely, the input rotational speed Nin is increased with increase of the acceleration operation amount θacc and with reduction of the running speed V, and such that the gear ratio γcvt is reduced with reduction of the acceleration operation amount θacc and with increase of the running speed V, namely, the input rotational speed Nin is reduced with reduction of the acceleration operation amount θacc and with increase of the running speed V. In this shifting control operation for the continuously-variable transmission 24, the gear ratio γcvt is controlled to be changed, basically, within the range between the above-described second gear ratio γ2 and the lowest gear ratio γmin. It is noted that the lowest gear ratio γmin corresponds to "third gear ratio" recited in the appended claims. The CVT shift control portion 126 causes the gear ratio γcvt of the continuously-variable transmission 24 to be changed in a stepless manner, for example, within the range between second gear ratio γ2 and the lowest gear ratio γmin in the present embodiment. However, the CVT shift control portion 126 may cause the gear ratio γcvt to be changed in a stepped manner, too, as in a step-variable transmission.

The lockup-clutch control portion 128 executes an engaging/releasing control operation for engaging and releasing the lockup clutch LU, by outputting the hydraulic control command signal Slu in accordance with a predetermined lockup map, based on the operation states such as the running speed V. Specifically, the engaging/releasing control operation is executed, for example, such that the lockup clutch LU is released when the vehicle 10 is running at a low speed with the running speed V being not higher than a predetermined speed value, and the lockup clutch LU is engaged when the running speed V exceeds the predetermined speed value.

Figure 5:
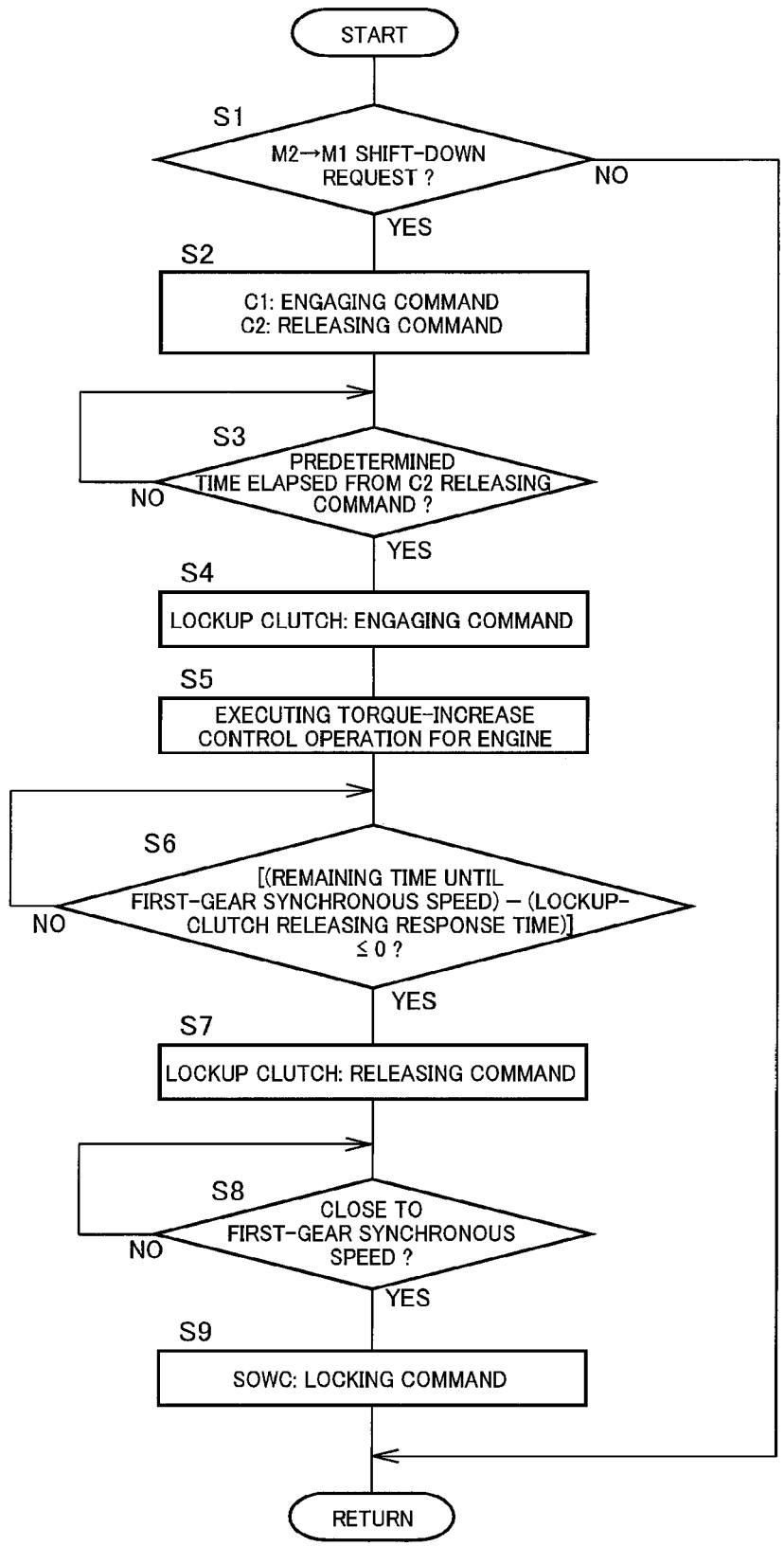
FIG. 5 is a flow chart for specifically explaining a signal processing executed by a manual shift-down control portion shown in FIG. 1.

The running-mode switch control portion 122 functionally includes a manual shift-down control portion 124 configured to execute, when a shift down action is to be executed in accordance with the shift-down request by the manual shift operation made by the vehicle driver, a control operation for shifting down from the M2 range to the M1 range in the M range. The manual shift-down control portion 124 executes a control routine including steps S1-S9 shown in a flow chart of FIG. 5, namely, executes a signal processing in accordance with the control routine. The manual shift-down control portion 124 corresponds to "shift-down control portion" recited in the appended claims.

The control routine is initiated with step S1 that is implemented to determine whether an M2→M1 shift-down request for shifting from the M2 range to the M1 range has been made or not, during running of the vehicle 10 in the driven state, namely, to determine whether the shift-down request for shifting from the M2 range to the M1 range has been made by the manual shift operation by the vehicle driver or not, during running of the vehicle 10 in the driven state at a predetermined running speed or higher, with the acceleration operation amount θacc being zero (acceleration OFF) and with the second gear position 2nd (providing the second gear ratio γ2 in the continuously-variable transmission 24) being established in the M2 range (belt running mode) in which the drive force is transmitted along the second drive-force transmission path PT2. When the M2→M1 shift-down request has not been made, one cycle of execution of the control routine is terminated. When the M2→M1 shift-down request has been made, step S1 is followed by step S2 that is implemented to output an engaging command for engaging the first clutch C1 and a releasing command for releasing the second clutch C2, for executing an M2→M1 shift-down action. Specifically, step S2 is implemented to output the hydraulic control command signal Scbs for outputting the C1 hydraulic pressure Pc1 and stopping output of the C2 hydraulic pressure Pc2.

Figure 6:
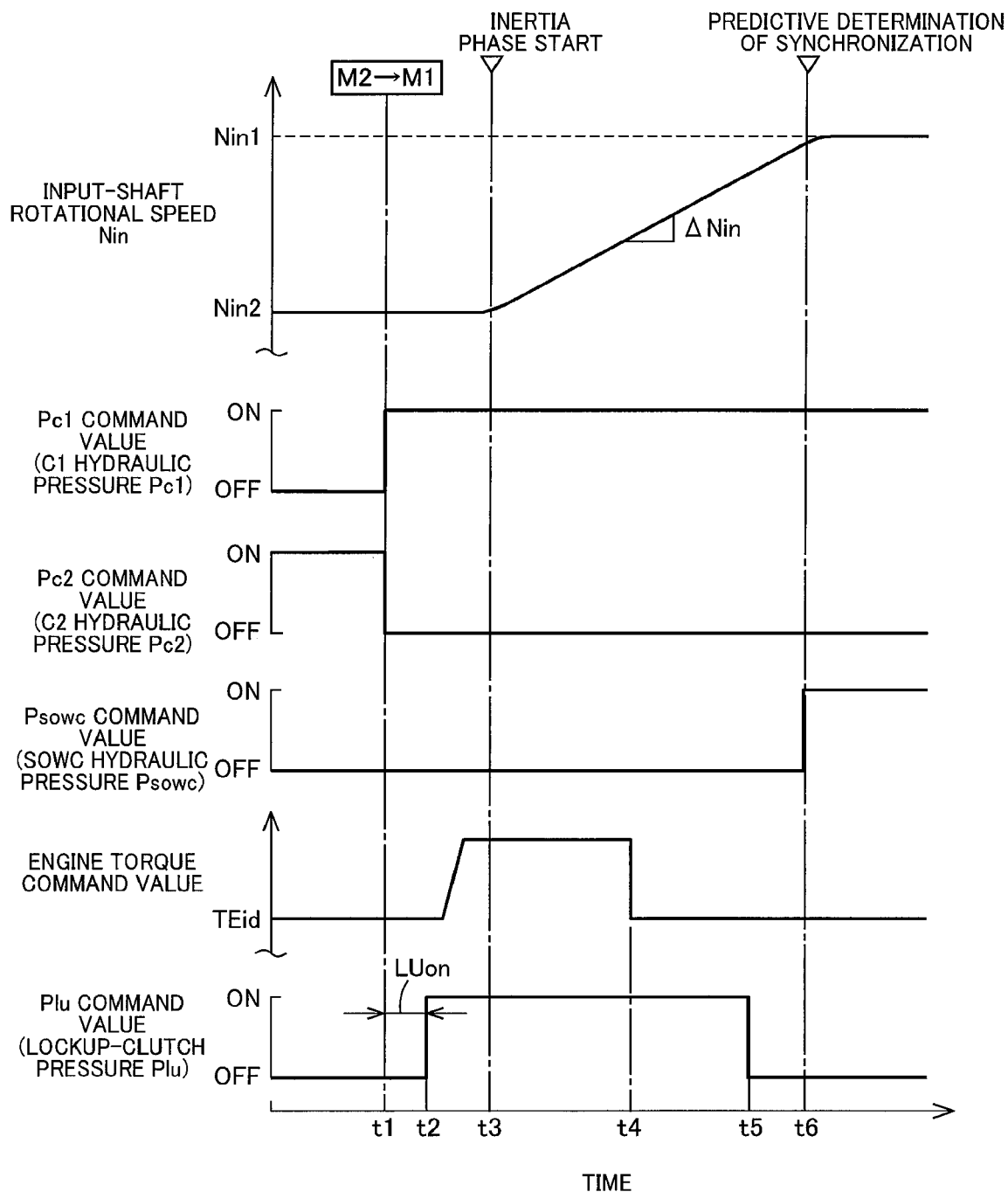
FIG. 6 is a time chart for explaining changes of operation states of respective parts when a shift-down action is executed in accordance with a control routine shown in the flow chart of FIG. 5.

FIG. 6 is a time chart for showing changes of operation states of respective parts when the M2→M1 shift-down action is executed by the manual shift-down control by the manual shift-down control portion 124. In FIG. 6, a time point t1 is a point of time at which the M2→M1 shift-down request is made whereby the C1 hydraulic pressure Pc1 is outputted (ON) and the output of the C2 hydraulic pressure Pc2 is stopped (OFF) by implementation of step S2. The C1 hydraulic pressure Pc1 and the C2 hydraulic pressure Pc2 shown in FIG. 6 are both command values, and their actual values are changed with delay relative to the command values at respective rates slower than the command values. Regarding the other command values (Psowc command value, Plu command value, engine-torque TE command value) that are shown in FIG. 6, too, their actual values are changed with delay relative to the command values at respective rates lower than the command values. At the time point t1, the input rotational speed Nin is a synchronous speed (2nd synchronous speed) Nin2 in the second gear position 2nd, the Psowc command value for the SOWC hydraulic pressure Psowc is OFF (output stop) whereby the mode-switching clutch device SOWC is placed in the one-way mode, the engine-torque TE command value is an idle torque value TEid, and the Plu command value for the lockup-clutch pressure Plu is OFF (output stop), whereby the lockup clutch LU is placed in the released state. The 2nd synchronous speed Nin2 can be represented by the following expression (1) using the output rotational speed Nout and the second gear ratio γ2.

$$Nin2 = Nout \times \gamma 2 \qquad (1)$$

Step S2 is followed by step S3 that is implemented to determine whether a predetermined LU-engaging-command determination time LUon has elapsed or not since the releasing command for releasing the second clutch C2 had been outputted (at the time point t1). If it is determined that the LU-engaging-command determination time LUon has elapsed, step S4 is implemented to output the engaging command for engaging the lockup clutch LU, specifically, output the hydraulic control command signal Slu by which the lockup-clutch pressure Plu is to be outputted. The engaging command for engaging the lockup clutch LU is outputted through the lockup-clutch control portion 128. The LU-engaging-command determination time LUon is determined based on a releasing response time tcoff of the second clutch C2 and an engaging response time tluon of the lockup clutch LU, for outputting the engaging command of the lockup clutch LU such that the lockup clutch LU is engaged after the second clutch C2 has been released. Specifically, as indicated in expression (2) given below, the LU-engaging-command determination time LUon is obtained by subtracting an engaging response time tluon from a releasing response time tcoff and then adding a predetermined margin time ty1 (to a difference between the engaging response time tluon from and the releasing response time tcoff). The releasing response time tcoff is a delayed time of release of the second clutch C2, namely, a length of time from the output of the releasing command until the second clutch C2 is actually released. The engaging response time tluon is a delayed time of engagement of the lockup clutch LU, namely, a length of time from the output of the engaging command until the lockup clutch LU is actually engaged. The LU-engaging-command determination time LUon may be set to either a constant value or a variable value that varies depending on the working fluid temperature THoil by which the releasing response time tcoff and the engaging response time tluon are influenced. The engaging command for engaging the lockup clutch LU after release of the second clutch C2, is outputted upon satisfaction of a predetermined condition or criteria which is that the LU-engaging-command determination time LUon has elapsed since the releasing command for releasing the second clutch C2 had been outputted (at the time point t1). The elapsed time since the output of the releasing command for releasing the second clutch C2 can be measured by, for example, a timer or the like. In FIG. 6, a time point t2 is a point of time at which the LU-engaging-command determination time LUon elapses and the engaging command for engaging the lockup clutch LU is outputted (ON).

$$LUon = tcoff - tluon + ty1 \quad (2)$$

At step S5, a torque-increase control operation is executed for the engine 12. Specifically, this torque-increase control operation is executed to temporarily increase the engine torque TE so as to quickly increase the input rotational speed Nin to a synchronous speed (first-gear synchronous speed) Nin1 of the first gear position 1st in the M1 range while suppressing the shifting shock. The execution of the torque-increase control operation is made through the engine control portion 120. Various setting values such as a value of the engine torque TE and an increased amount of the engine torque in the execution of the torque-increase control operation, a start timing and an end timing of the execution of the torque-increase control operation, and a duration of the execution of the torque-increase control operation are predetermined through experimentation or the like, such that the input rotational speed Nin can be appropriately increased. However, the setting values may be learned (corrected) based on, for example, change of the actual input rotational speed Nin.

In FIG. 6, a time point t3 is a point of time at which an inertia phase in which the input rotational speed Nin is increased from the 2nd synchronous speed Nin2 by the execution of the torque-increase control operation, is started. At this point of time, the second clutch C2 is completely released while the first clutch C1 and the lockup clutch LU are completely engaged, and the input rotational speed Nin is gradually increased at a predetermined rate of change, which is substantially constant. In the torque-increase control operation for the engine 12, the various setting values such as the start timing and the end timing of the execution of the torque-increase control operation and the increased amount of the engine torque TE are determined by taking account of, for example, a delay of response of the engine torque TE, such that the rotational speed Nin can be smoothly or gradually increased after the second clutch C2 has been released and the first clutch C1 and the lockup clutch LU have been completely released. In FIG. 6, a torque increasing command for increasing the engine torque TE is outputted after the time point t2 at which the engaging command for engaging the lockup clutch LU is outputted. However, depending on a time of the delay of response of the engine torque TE, the torque increasing command may be outputted before the time point t2 at which the engaging command is outputted. A time point t4 in FIG. 6 is a point of time at which the execution of the torque-increase control operation ends.

At step S6, a timing of output of a releasing command for releasing the lockup clutch LU is determined in accordance with a predetermined condition or criteria, which is determined such that the lockup clutch LU is released before, more specifically, shortly before the input rotational speed Nin reaches the synchronous speed (first-gear synchronous speed) Nin1 of the first gear position 1st in the M1 range after the shift-down operation. Described specifically, an actual rate (speed) of change ΔNin of the input rotational speed Nin is calculated, and then a remaining time (estimated value) tsync until the input rotational speed Nin reaches the first-gear synchronous speed Nin1 is consecutively calculated in accordance with expression (3) given below, based on the actual input rotational speed Ninx, first-gear synchronous speed Nin1 and rate of change ΔNin. The rate of change ΔNin is, for example, an amount ΔNin of change of the input rotational speed Nin within a length of time corresponding to an interval between successive readings of the input rotational speed Nin. Then, it is determined whether the calculated remaining time tsync has become not longer than a length of time that is obtained by adding a margin time ty2 to the releasing response time tluoff, as indicated in expression (4) given below. Thus, the above-described predetermined criteria is satisfied when the expression (4) is satisfied. Where the margin time ty2 is set to substantially zero, the lockup clutch LU can be released shortly before the input rotational speed Nin reaches the first-gear synchronous speed Nin1. The first-gear synchronous speed Nin1 can be represented by the following expression (5) using the output rotational speed Nout and the first gear ratio γ1 (=γgear). Further, the releasing response time tluoff is a delayed time of release of the lockup clutch LU, namely, a length of time from the output of the releasing command until the lockup clutch LU is actually released. The releasing response time tluoff may be set to either a constant value or a variable value that varies depending on, for example, the working fluid temperature THoil by which the releasing response time tluoff is influenced. Still further, the rate of change ΔNin may be set to a constant value that is dependent on the engine torque TE during the execution of the torque-increase control operation.

$$tsync = (Nin1 - Ninx)/\Delta Nin \quad (3)$$

$$tsync \leq tluoff + ty2 \quad (4)$$

$$Nin1 = Nout \times \gamma 1 \quad (5)$$

It is also possible to determine the timing of output of the releasing command for releasing the lockup clutch LU, depending on whether a difference between the first-gear synchronous speed Nin1 and the actual input rotational speed Ninx has become not larger than a LU-release-command determination value α that is predetermined such that the lockup clutch LU is released before the input rotational speed Nin reaches the first-gear synchronous speed Nin1, as indicated in expression (6) given below. The LU-release-command determination value α may be set to a constant value predetermined depending on, for example, the releasing response time tluoff of the lockup clutch LU. However, the LU-release-command determination value α may be set to a variable value that varies depending on, for example, the actual rate of change ΔNin of the input rotational speed Nin and the working fluid temperature THoil by which the releasing response time tluoff is influenced. Where the LU-release-command determination value α is set to the variable value dependent on the actual rate of change ΔNin, the expression (6) also may be regarded as the predetermined criteria that is determined based on the rate of change ΔNin and the releasing response time tluoff, in terms of the timing of output of the releasing command for releasing the lockup clutch LU.

$$Nin1 - Ninx \leq \alpha \quad (6)$$

The step S6 is repeatedly implemented until the expression (4) (or the expression (6)) is satisfied. When the expression (4) (or the expression (6)) is satisfied, step S7 is implemented to output the releasing command for releasing the lockup clutch LU, specifically, output the hydraulic control command signal Slu by which the output of the lockup-clutch pressure Plu is to be stopped (OFF). The releasing command for releasing the lockup clutch LU is outputted through the lockup-clutch control portion 128. In FIG. 6, a time point t5 is a point of time at which the releasing command for releasing the lockup clutch LU is outputted upon satisfaction of the expression (4) (or the expression (6)).

Step S8 is implemented to determine whether the input rotational speed Nin has become close to the first-gear synchronous speed Nin1 or not, and is repeatedly implemented until the input rotational speed Nin has become close to the first-gear synchronous speed Nin1. When the input rotational speed Nin has become close to the first-gear synchronous speed Nin1, step S9 is implemented to output a locking command for switching the mode-switching clutch device SOWC to the lock mode, specifically, output the hydraulic control command signal Scbs for outputting (ON) the SOWC hydraulic pressure Psowc. In the step S8, the timing of output of the locking command is determined depending on whether the difference between the first-gear synchronous speed Nin1 and the actual input rotational speed Ninx has becomes not larger than a locking-command determination value β, as indicated in expression (7) given below, wherein the locking-command determination value β is a predetermined value that is determined by taking account of a delayed time (locking response time) tsowc from the output of the locking command until the mode-switching clutch device SOWC is actually switched to the lock mode, such that the mode-switching clutch device SOWC is switched to the lock mode immediately after the input rotational speed Nin has reached the first-gear synchronous speed Nin1. Further, it is also possible to determine the timing of output of the locking command, depending on whether the above-described remaining time tsync has become not longer than a value obtained by subtracting a margin time ty3 from the locking response time tsowc, as indicated in expression (8) given below. Each of the expressions (7), (8) corresponds to a predetermined criteria that is determined depending on the locking response time tsowc such that the mode-switching clutch device SOWC is switched to the lock mode after the input rotational speed Nin has reached the first-gear synchronous speed Nin1. The locking-command determination value β may be set to either a predetermined constant value or a variable value that varies, for example, depending on the rate of change ΔNin of the input rotational speed Nin and the working fluid temperature THoil. The locking-command determination value β may be set to zero (β=0), too. The locking response time tsowc may be set to either a predetermined constant value or a variable value that varies depending on, for example, the working fluid temperature THoil by which the locking response time tsowc is influenced. In FIG. 6, a time point t6 is a point of time at which the locking command for switching the mode-switching clutch device SOWC to the lock mode upon satisfaction of the expression (7) (or the expression (8)).

$$Nin1 - Ninx \leq \beta \quad (7)$$

$$tsync \leq tsowc - ty3 \quad (8)$$

As described above, in the electronic control apparatus 100 according to the present embodiment, which is the shift control apparatus for the automatic transmission 23, when the M2→M1 manual shift-down action is executed in response to the manual shift operation executed by the vehicle driver, to establish the first gear position 1st during the running of the vehicle 10 in the driven state with the second gear position 2nd being established, the input rotational speed Nin is increased through the lockup clutch LU placed in the engaged state during execution of the torque-increase control operation for increasing the torque of the engine 12, so that the controllability of the input rotational speed Nin is improved whereby the input rotational speed Nin can be quickly increased and accordingly the shift-down operation can be appropriately executed. Further, since the lockup clutch LU is released before the input rotational speed Nin reaches the first-gear synchronous speed Nin1, it is possible to appropriately suppress a shifting shock caused by, for example, an engine inertia upon synchronization of the input rotational speed Nin after execution of the shift-down operation. That is, when the shift-down operation is executed to establish the first gear position 1st during the running of the vehicle 10 in the driven state, with the input rotational speed Nin being increased by the execution of the torque-increase control operation for increasing the torque of the engine 12, it is possible to assure the controllability of the input rotational speed Nin by causing the input shaft 22 to be connected directly to the engine 12, and to suppress the shifting shock upon the synchronization by casing the lockup clutch LU to be released before the synchronization after the execution of the shift-down operation.

Further, the first engagement device provided in the first drive-force transmission path PT1 includes the mode-switching clutch device SOWC that is to be switched between the one-way mode and the lock mode, there is a possibility that a noise such as a contact noise could be generated due to an effect of the one-way mode, i.e., the same effect of the first one-way clutch 96*a* upon the synchronization (upon completion of the shifting action), since the mode-switching clutch device SOWC is switched from the one-way mode to the lock mode immediately after the input rotational speed Nin has reached the first-gear synchronous speed Nin1 However, in the present embodiment, the lockup clutch LU is released before the input rotational speed Nin reaches the first-gear synchronous speed Nin1, the generation of the noise such as the contact noise can be suppressed. Further, by placing the mode-switching clutch device SOWC into the lock mode immediately after the input rotational speed Nin has reached the first-gear synchronous speed Nin1, the engine 12 is driven depending on the running speed V whereby the engine brake can be appropriately obtained.

Further, the first engagement device includes the mode-switching clutch device SOWC and the first clutch C1 and the second engagement device includes the second clutch C2, and the second clutch C2 is engaged while the first clutch C1 is released when the D2 range or M2 range of the belt running mode including the second gear position 2nd is established. Therefore, when the D2 range or M2 range of the belt running mode is established, the mode-switching clutch device SOWC is held in a state in which its rotation is substantially stopped, so that a load applied to the engine 12 is reduced whereby a fuel efficiency is improved. Further, when the M2→M1 shift-down action is executed from the second gear position 2nd to the first gear position 1st, in response to the manual shift operation executed by the vehicle driver, the second clutch C2 is released and the first clutch C1 is engaged prior to execution of the torque-increase control operation for increasing the torque of the engine 12, so that the input rotational speed Nsowc of the mode-switching clutch device SOWC is increased together with increase of the input rotational speed Nin, whereby the shift-down action can be smoothly progressed.

Further, in the step S6, the rate of change ΔNin of the input rotational speed Nin is calculated and then the remaining time tsync until the input rotational speed Nin reaches the first-gear synchronous speed Nin1 is obtained, so that the timing of the output of the releasing command for releasing the lockup clutch LU is determined, in accordance with the predetermined criteria in the form of the above-described expression (4), based on the remaining time tsync and the releasing response time tluoff of the lockup clutch LU, wherein the expression (4) is determined such that the lockup clutch LU is released before the input rotational speed Nin reaches the first-gear synchronous speed Nin1. Owing to this arrangement, it is possible to release the lockup clutch LU at the timing that is suitable for suppressing the shifting shock upon the synchronization after the execution of the shift-down operation, while assuring the controllability of the input rotational speed Nin by the engagement of the lockup clutch LU.

Further, in a case in which the timing for the output of the releasing command for releasing the lockup clutch LU is determined in accordance with the expression (6) using the LU-release-command determination value α at the above-described step S6, too, the LU-release-command determination value α is determined based on the releasing response time tluoff of the lockup clutch LU. Where the LU-release-command determination value α is set to a variable value that varies depending on the rate of change ΔNin of the input rotational speed Nin and the working fluid temperature THoil, it is possible to release the lockup clutch LU at a suitable timing that makes it possible to appropriately suppress the shifting shock upon the synchronization after the execution of the shift-down operation, while assuring the controllability of the input rotational speed Nin owing to the engagement of the lockup clutch LU.

Further, at step S3, the timing of the output of the engaging command for engaging the lockup clutch LU is determined in accordance with the predetermined criteria, based on the releasing response time tcoff of the second clutch C2 and the engaging response time tluon of the lockup clutch LU, wherein the predetermined criteria is determined such that the lockup clutch LU is engaged after the second clutch C2 has been released. Specifically, it is determined whether the elapsed time from the output of the releasing command for releasing the second clutch C2 has reached the LU-engaging-command determination time LUon that is obtained in accordance with the expression (2), and then it is determined that the engaging command for engaging the lockup clutch LU is to be outputted when the elapsed time has reached the LU-engaging-command determination time LUon. Owing to this arrangement, the second drive-force transmission path PT2 is cut off upon engagement of the lockup clutch LU, whereby a shock upon the engagement of the lockup clutch LU can be suppressed while the controllability of the input rotational speed Nin can be improved by the direct connection of the input shaft 22 with the engine 12.

While the preferred embodiment of this invention has been described in detail by reference to the drawings, it is to be understood that the embodiment described above is given for illustrative purpose only, and that the present invention may be embodied with various modifications and improvements which may occur to those skilled in the art.

NOMENCLATURE OF ELEMENTS

10: vehicle
12: engine
14: drive wheels
20: torque converter (hydraulic transmission device)
22: input shaft
23: automatic transmission (vehicle automatic transmission)
24: continuously-variable transmission
28: gear transmission mechanism (gear transmission device)
100: electronic control apparatus (shift control apparatus)
124: manual shift-down control portion (shift-down control portion)
PT1: first drive-force transmission path
PT2: second drive-force transmission path
LU: lockup clutch
C1: first clutch (first engagement device)
C2: second clutch (second engagement device)
SOWC: mode-switching clutch device (first engagement device)
Nin: input rotational speed
Nin1: first-gear synchronous speed (synchronous speed of first gear position)
ΔNin: rate of change
M1: M1 range (first gear position)
M2: M2 range (second gear position)

What is claimed is:

1. A shift control apparatus for a vehicle automatic transmission that is to be provided in a vehicle, the vehicle including, in addition to the vehicle automatic transmission, a hydraulic transmission device having a lockup clutch, an engine, an input shaft connected to the engine through the hydraulic transmission device, and drive wheels,
   wherein the vehicle automatic transmission is disposed between the input shaft and the drive wheels, and includes first and second engagement devices, such that at least a first gear position is established with the first engagement device being engaged, and at least a second gear position is established with the second engagement device being engaged, and such that the vehicle automatic transmission is configured to transmit a drive force at a first gear ratio when the first gear position is established, and to transmit the drive force at a second gear ratio lower than the first gear ratio when the second gear position is established,
   wherein the shift control apparatus comprises a shift-down control portion configured, when a shift-down operation is executed to establish the first gear position by releasing the second engagement device, during running of the vehicle in a driven state with the second gear position being established with engagement of the second engagement device, to execute a torque-increase control operation for increasing a torque of the engine so as to increase an input rotational speed as a rotational speed of the input shaft through the lockup clutch that is placed in an engaged state, and to release the lockup clutch before the input rotational speed reaches a synchronous speed of the first gear position.

2. The shift control apparatus according to claim 1, wherein the vehicle automatic transmission has first and second drive-force transmission paths provided in parallel to each other between the input shaft and the drive wheels, wherein the first drive-force transmission path is provided with the first engagement device, such that the drive force is to be transmitted along the first drive-force transmission path when the first gear position is established with engagement of the first engagement device, and wherein the second drive-force transmission path is provided with the second engagement device, such that the drive force is to be transmitted along the second drive-force transmission path when the second gear position is established with engagement of the second engagement device.

3. The shift control apparatus according to claim 2, wherein the first engagement device includes a mode-switching clutch device that is switchable between a one-way mode and a lock mode, such that the mode-switching clutch device is configured to transmit the drive force during the running of the vehicle in a driving state and to cut off transmission of the drive force during the running of the vehicle in the driven state when the mode-switching clutch device is placed in the one-way mode, and such that the mode-switching clutch device is configured to transmit the drive force during the running of the vehicle in the driving state and during the running of the vehicle in the driven state when the mode-switching clutch device is placed in the lock mode, and wherein the shift-down control portion is configured to switch the mode-switching clutch device from the one-way mode to the lock mode in a stage in which the input rotational speed has reached the synchronous speed of the first gear position.

4. The shift control apparatus according to claim 3, wherein the first engagement device includes, in addition to the mode-switching clutch device, a first clutch that is to be frictionally engaged, wherein the first drive-force transmission path is provided with the mode-switching clutch device and the first clutch, such that the first clutch is disposed in series with the mode-switching clutch device and is located between the mode-switching clutch device and the input shaft in the first drive-force transmission path, wherein the second engagement device includes a second clutch that is to be frictionally engaged, wherein the second drive-force transmission path is provided with the second clutch, and wherein, when the shift-down operation is executed to switch the vehicle automatic transmission to the first gear position from the second gear position that is established with engagement of the second clutch and release of the first clutch, the shift-down control portion is configured to release the second clutch and engage the first clutch, prior to execution of the torque-increase control operation for increasing the torque of the engine.

5. The shift control apparatus according to claim 2, wherein the first drive-force transmission path is provided with a gear transmission mechanism that is disposed in series with the first engagement device in the first drive-force transmission path, such that the drive force is to be transmitted at the first gear ratio through the gear transmission mechanism along the first drive-force transmission path when the first gear position is established with engagement of the first engagement device, and wherein the second drive-force transmission path is provided with a continuously-variable transmission that is disposed in series with the second engagement device in the second drive-force transmission path, such that the drive force is to be transmitted at an arbitrary gear ratio through the continuously-variable transmission along the second-force transmission path, the arbitrary gear ratio being at least between the second gear ratio and a third gear ratio that is lower than the second gear ratio.

6. The shift control apparatus according to claim 1, wherein the shift-down control portion is configured to calculate a rate of change of the input rotational speed, and to determine a timing of output of a releasing command for releasing the lockup clutch, in accordance with a predetermined criteria, based on the calculated rate of change and a releasing response time that is a length of time from the output of the releasing command until the lockup clutch is actually released, the predetermined criteria being determined such that the lockup clutch is released before the input rotational speed reaches the synchronous speed of the first gear position.

7. The shift control apparatus according to claim 6, wherein the shift-down control portion is configured to estimate a remaining time until the input rotational speed reaches the synchronous speed of the first gear position, based on the rate of change of the input rotational speed, and to determine the timing of the output of the releasing command for releasing the lockup clutch, by comparing the remaining time and the releasing response time.

8. The shift control apparatus according to claim 1, wherein the shift-down control portion is configured, when the lockup clutch is in a released state during the running of the vehicle in the driven state with the second gear position being established, to determine a timing of output of an engaging command for engaging the lockup clutch, in accordance with a predetermined criteria, based on a response time that is a length of time from output of a releasing command for releasing the second engagement device until the second engagement device is actually released, and a response time that is a length of time from the output of the engaging command for engaging the lockup clutch until the lockup clutch is actually engaged, the predetermined criteria being determined such that the lockup clutch is engaged after the second engagement device has been released.

9. The shift control apparatus according to claim 1, further comprising an engine control portion and a lockup-clutch control portion, wherein the shift-down control portion is configured to cause the engine control portion to execute the torque-increase control operation, and wherein the shift-down control portion is configured to cause the lockup-clutch control portion to release the lockup clutch before the input rotational speed reaches the synchronous speed of the first gear position.

\* \* \* \* \*